(12) United States Patent
Takayama et al.

(10) Patent No.: US 8,393,074 B1
(45) Date of Patent: Mar. 12, 2013

(54) METHOD OF MANUFACTURING THERMALLY-ASSISTED MAGNETIC RECORDING HEAD AND ALIGNMENT APPARATUS

(75) Inventors: Seiichi Takayama, Tokyo (JP); Koji Shimazawa, Tokyo (JP); Shinji Hara, Tokyo (JP); Yasuhiro Ito, Tokyo (JP); Nobuyuki Mori, Tokyo (JP); Ryo Hosoi, Tokyo (JP); Kazuaki Takanuki, Tokyo (JP); Youichi Ando, Tokyo (JP); Chimoto Sugiyama, Tokyo (JP)

(73) Assignees: TDK Corporation, Tokyo (JP); Sae Magnetics (H.K) Ltd., Hong Kong (CN)

( * ) Notice: Subject to any disclaimer, the term of this patent is extended or adjusted under 35 U.S.C. 154(b) by 32 days.

(21) Appl. No.: 13/267,601

(22) Filed: Oct. 6, 2011

(51) Int. Cl.
  *G11B 5/127* (2006.01)
  *H04R 31/00* (2006.01)
(52) U.S. Cl. ............... 29/603.12; 29/603.03; 29/603.13; 29/603.17; 29/729; 29/737; 360/59; 360/121; 360/122; 360/317; 250/201.3; 250/201.5; 369/112.09; 369/112.14; 369/112.21; 369/112.27; 369/300; 369/30.01; 369/30.02
(58) Field of Classification Search ............... 29/603.07, 29/603.13–603.16, 603.18, 729, 737; 250/201.3, 250/201.5; 360/59, 121, 122, 317; 369/30.01, 369/30.02, 13.33, 13.13, 13.32, 112.09, 112.14, 369/112.21, 112.27, 300; 385/31, 88–94, 385/129
See application file for complete search history.

(56) References Cited

U.S. PATENT DOCUMENTS

| 7,974,043 | B2 | 7/2011 | Shimazawa et al. | |
|---|---|---|---|---|
| 8,149,653 | B2 * | 4/2012 | Shimazawa et al. | 369/13.33 |
| 8,248,892 | B2 * | 8/2012 | Shimazawa et al. | 369/13.32 |
| 8,248,895 | B2 * | 8/2012 | Shimazawa et al. | 369/13.33 |
| 8,254,214 | B2 * | 8/2012 | Shimazawa et al. | 369/13.33 |
| 8,274,867 | B2 * | 9/2012 | Mori et al. | 369/13.33 |
| 8,310,903 | B1 * | 11/2012 | Takayama et al. | 369/30.01 |
| 2008/0043360 | A1 | 2/2008 | Shimazawa et al. | |
| 2009/0052078 | A1 | 2/2009 | Tanaka et al. | |

FOREIGN PATENT DOCUMENTS

JP  A-2008-59694  3/2008

* cited by examiner

*Primary Examiner* — Paul D Kim
(74) *Attorney, Agent, or Firm* — Oliff & Berridge, PLC

(57) ABSTRACT

A method of manufacturing a thermally-assisted magnetic recording head includes: providing a light source unit including a laser diode; providing a slider having a thermally-assisted magnetic recording head section thereon, the thermally-assisted magnetic recording head section including a magnetic pole, an optical waveguide, and a plasmon generator, the magnetic pole and the optical waveguide both extending toward an air bearing surface, the plasmon generator being located between the magnetic pole and the optical waveguide; driving the laser diode to allow a light beam to be emitted therefrom, the light beam including both a TE polarization component and a TM polarization component; performing an alignment between the light source unit and the thermally-assisted magnetic recording head section, based on a light intensity distribution of the TE polarization component in the light beam which has been emitted from the laser diode and then passed through the optical waveguide; and bonding the light source unit to the slider after the alignment is completed.

15 Claims, 17 Drawing Sheets

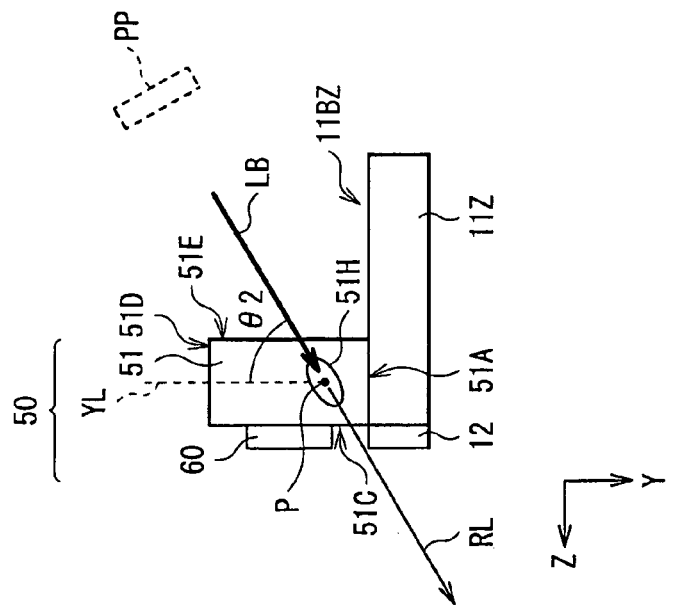
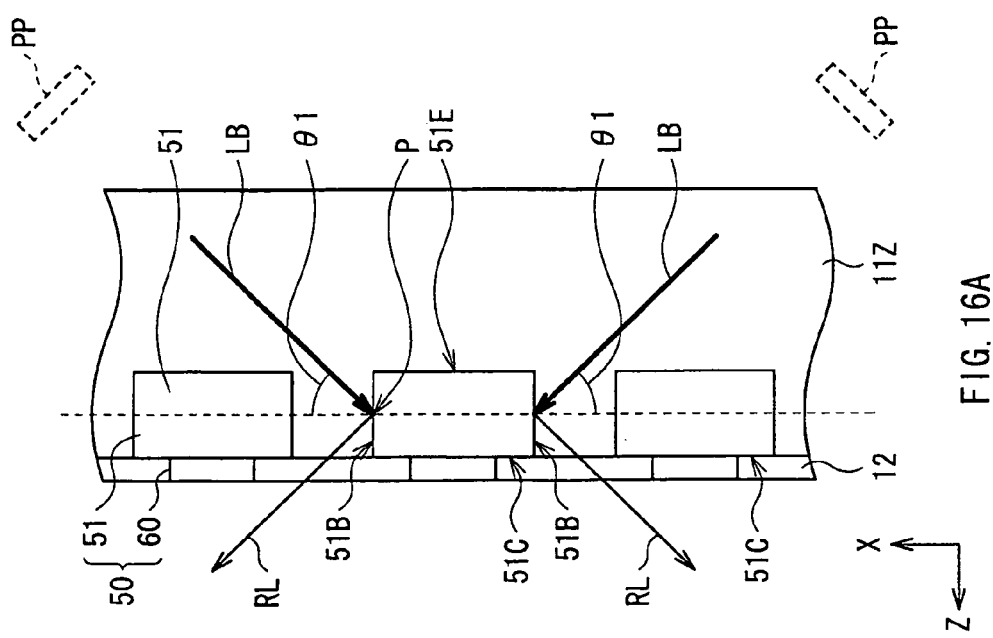
FIG. 16B
FIG. 16A

METHOD OF MANUFACTURING THERMALLY-ASSISTED MAGNETIC RECORDING HEAD AND ALIGNMENT APPARATUS

BACKGROUND OF THE INVENTION

1. Field of the Invention

The present invention relates to a method of manufacturing a thermally-assisted magnetic recording head used in a thermally-assisted magnetic recording in which near-field light is applied to a magnetic recording medium to lower a coercivity thereof so as to record information, and an alignment apparatus used therefor.

2. Description of Related Art

A magnetic disk device in the related art is used for writing and reading magnetic information (hereinafter, simply referred to as information). The magnetic disk device is provided with, in the housing thereof, a magnetic disk in which information is stored, and a magnetic read write head which records information into the magnetic disk and reproduces information stored in the magnetic disk. The magnetic disk is supported by a rotary shaft of a spindle motor, which is fixed to the housing, and rotates around the rotary shaft. On the other hand, the magnetic read write head is formed on a side surface of a magnetic head slider provided on one end of a suspension, and the magnetic read write head includes a magnetic write element and a magnetic read element which have an air bearing surface (ABS) facing the magnetic disk. In particular, as the magnetic reproducing element, a magneto-resistive (MR) element exhibiting magneto resistive effect is generally used. The other end of the suspension is attached to an edge of an arm which is rotatably supported by a fixed shaft installed upright in the housing.

When the magnetic disk device is not operated, namely, when the magnetic disk does not rotate, the magnetic read write head is not located over the magnetic disk and is pulled off to the position away from the magnetic disk (unload state). When the magnetic disk device is driven and the magnetic disk starts to rotate, the magnetic read write head is changed to a state where the magnetic read write head is located at a predetermined position over the magnetic disk together with the suspension (load state). When the rotation number of the magnetic disk reaches a predetermined number, the magnetic head slider is stabilized in a state of slightly floating over the surface of the magnetic disk due to the balance of positive pressure and negative pressure. Thus, the information is accurately recorded and reproduced.

In recent years, with a progress in higher recording density (higher capacity) of the magnetic disk, an improvement in performance of the magnetic read write head and the magnetic disk has been demanded. The magnetic disk is a discontinuous medium including collected magnetic microparticles, and each magnetic microparicle has a single-domain structure. In the magnetic disk, one recording bit is configured by a plurality of magnetic microparticles. Since the asperity of a boundary between adjacent recording bits is necessary to be small in order to increase the recording density, the magnetic microparticles need to be made small. However, if the magnetic microparticles are small in size, thermal stability of the magnetization of the magnetic micorparticles is lowered with decreasing the volume of the magnetic maicroparticles. To solve the difficulty, increasing anisotropic energy of the magnetic microparticles is effective. However, increasing the anisotropic energy of the magnetic microparticles leads to increase in the coercivity of the magnetic disk. As a result, difficulty occurs in the information writing using the existing magnetic head.

As a method to solve the above-described difficulty, a so-called thermally-assisted magnetic recording has been proposed. In the method, a magnetic recording medium with large coercivity is used, and when writing information, heat is applied together with the magnetic field to a portion where the information is recorded out of the magnetic recording medium to increase the temperature and to lower the coercivity, thereby writing the information. Hereinafter, the magnetic head used in the thermally-assisted magnetic recording is referred to as a thermally-assisted magnetic recording head.

In the thermally-assisted magnetic recording, near-field light is generally used for applying heat to the magnetic recording medium. As a method of generating near-field light, a method using a near-field light probe that is a metal strip, namely, so-called plasmon generator is generally known. In the plasmon generator, plasmons are generated by excitation by incident light from the outside, and as a result, near-field light is generated. As for the arrangement of the light source which is required to supply the incident light from the outside, various configurations have been proposed up to now. The applicant has been proposed a thermally-assisted magnetic recording head having a "composite slider structure" in which a light source unit including a laser oscillator is bonded to a surface of the slider formed with a magnetic write element which is opposite to the surface of the ABS. The "composite slider structure" is disclosed in U.S. Patent Application Publication No. 2008/043360 specification and U.S. Patent Application Publication No. 2009/052078 specification.

In the method of performing thermally-assisted magnetic recording with use of a plasmon generator, it is important to stably supply light with sufficient intensity to a desired position on the magnetic recording medium. Therefore, it is necessary to secure high alignment accuracy for fixing a light source unit to a slider. Reduction in alignment accuracy causes reduction in heating efficiency with respect to a magnetic recording medium, and it is serious issue in thermally-assisted magnetic recording. From the reason, it is desirable to provide a method capable of easily and accurately manufacturing a thermally-assisted magnetic recording head excellent in write efficiency. Moreover, it is also desirable to provide an alignment apparatus suitable for such a method of manufacturing a thermally-assisted magnetic recording head.

SUMMARY OF THE INVENTION

A method of manufacturing a thermally-assisted magnetic recording head according to an embodiment of the invention includes steps of the following (A1) to (A5):

(A1) a step of providing a light source unit including a laser diode;

(A2) a step of providing a slider having a thermally-assisted magnetic recording head section thereon, the thermally-assisted magnetic recording head section including a magnetic pole, an optical waveguide, and a plasmon generator, the magnetic pole and the optical waveguide both extending toward an air bearing surface, the plasmon generator being located between the magnetic pole and the optical waveguide;

(A3) a step of driving the laser diode to allow a light beam to be emitted therefrom, the light beam including both a TE polarization component and a TM polarization component;

(A4) a step of performing an alignment between the light source unit and the thermally-assisted magnetic recording head section, based on a light intensity distribution of the TE polarization component in the light beam which has been emitted from the laser diode and then passed through the optical waveguide; and (A5) a step of bonding the light source unit to the slider after the alignment is completed.

In the method of manufacturing a thermally-assisted magnetic recording head according to the embodiment of the invention, an alignment between the light source unit and the thermally-assisted magnetic recording head section is performed using the TE polarization component which has passed through the optical waveguide in the light beam from the laser diode. The TE polarization component having passed through the optical waveguide indicates monomodality, namely, an intensity distribution with a single peak. Accordingly, an optimal position as a reference for an alignment is determined with relative ease, and therefore an alignment is allowed to be performed with higher accuracy.

A method of manufacturing a thermally-assisted magnetic recording head according to another embodiment of the invention includes steps of the following (B1) to (B5):

(B1) a step of providing a light source unit including a laser diode;

(B2) a step of providing a slider having a thermally-assisted magnetic recording head section thereon, the thermally-assisted magnetic recording head section including a magnetic pole, an optical waveguide, and a plasmon generator, the magnetic pole and the optical waveguide both extending toward an air bearing surface, the plasmon generator being located between the magnetic pole and the optical waveguide;

(B3) a step of driving the laser diode to allow a light beam to be emitted therefrom, the light beam including both a monomobal component exhibiting a light intensity distribution with a single peak and a bimodal component exhibiting a light intensity distribution with two peaks;

(B4) a step of performing an alignment between he light source unit and the thermally-assisted magnetic recording head section, based on the intensity distribution of the monomodal component in the light beam which has been emitted from the laser diode and then passed through the optical waveguide; and (A5) a step of bonding the light source unit to the slider after the alignment is completed.

Also in the method of manufacturing a thermally-assisted magnetic recording head in the embodiment, an optimal position as a reference for an alignment is determined with relative ease, and therefore an alignment is allowed to be performed with higher accuracy.

An alignment apparatus according to an embodiment of the invention allows a light source unit including a laser diode to be aligned with a slider having a thermally-assisted magnetic recording head section thereon, the thermally-assisted magnetic recording head section including a magnetic pole, an optical waveguide, and a plasmon generator, the magnetic pole and the optical waveguide both extending toward an air bearing surface, the plasmon generator being located between the magnetic pole and the optical waveguide, the alignment apparatus including the following (C1) to (C3):

(C1) a driver driving the laser diode to allow a light beam to be emitted therefrom, the light beam including both a TE polarization component and a TM polarization component;

(C2) a photo-reception device receiving a light beam which has been emitted from the laser diode and then passed through the optical waveguide;

(C3) a controller controlling a relative-positional relationship between the light source unit and the slider, based on a light intensity distribution of the TE polarization component in the light beam which comes into the photo-reception device.

In the alignment apparatus according to the embodiment of the invention, the photo-reception device receives the TE polarization component in the light beam which has been emitted from the laser diode and then passed through the optical waveguide, and then detects the light intensity distribution of the TE polarization component. An alignment between the light source unit and the slider is allowed to be performed using the light intensity distribution of the TE polarization component. The TE polarization component indicates monomodality, that is, an intensity distribution with a single peak. Accordingly, an optimal position as a reference for an alignment is determined with relative ease, and therefore an alignment is allowed to be performed with higher accuracy.

An alignment apparatus according to another embodiment of the invention allows a light source unit including a laser diode to be aligned with a slider having a thermally-assisted magnetic recording head section thereon, the thermally-assisted magnetic recording section including a magnetic pole, an optical waveguide, and a plasmon generator, the magnetic pole and the optical waveguide both extending toward an air bearing surface, the plasmon generator being located between the magnetic pole and the optical waveguide, the alignment apparatus including the following (D1) to (D3):

(D1) a diver driving the laser diode to allow a light beam to be emitted therefrom, the light beam including both a monomodal component exhibiting a light intensity distribution with a single peak and a bimodal component exhibiting a light intensity distribution with two peaks;

(D2) a photo-reception device receiving a light beam which has been emitted from the laser diode and then passed through the optical waveguide; and (D3) a controller controlling a relative-positional relationship between the light source unit and the slider, based on a light intensity distribution of the monomodal component in the light beam which comes into the photo-reception device.

Also in the alignment apparatus in the embodiment, an optimal position as a reference for an alignment is determined with relative ease, and therefore an alignment is allowed to be performed with higher accuracy.

The method of manufacturing a thermally-assisted magnetic recording head according to the embodiment of the invention preferably further includes a step of removing, with use of a polarizing plate, the TM polarization component in the light beam which has been emitted from the laser diode. This is because an optimal position as a reference for the alignment is more easily determined. For the similar reason, the alignment apparatus according to the embodiment of the invention preferably further includes a polarizing plate removing the TM polarization component in the light which has been emitted from the laser diode.

BRIEF DESCRIPTION OF THE DRAWINGS

FIG. 16 is perspective views illustrating a process following the process of FIG. 15.

DETAILED DESCRIPTION OF THE PREFERRED EMBODIMENTS

Hereinafter, a preferred embodiment of the invention will be described in detail with reference to drawings.

[1. Configuration of Magnetic Disk Device]

First, referring to FIG. 1 and FIG. 2, a configuration of a magnetic disk device will be described below as an embodiment of the invention.

Figure 1:
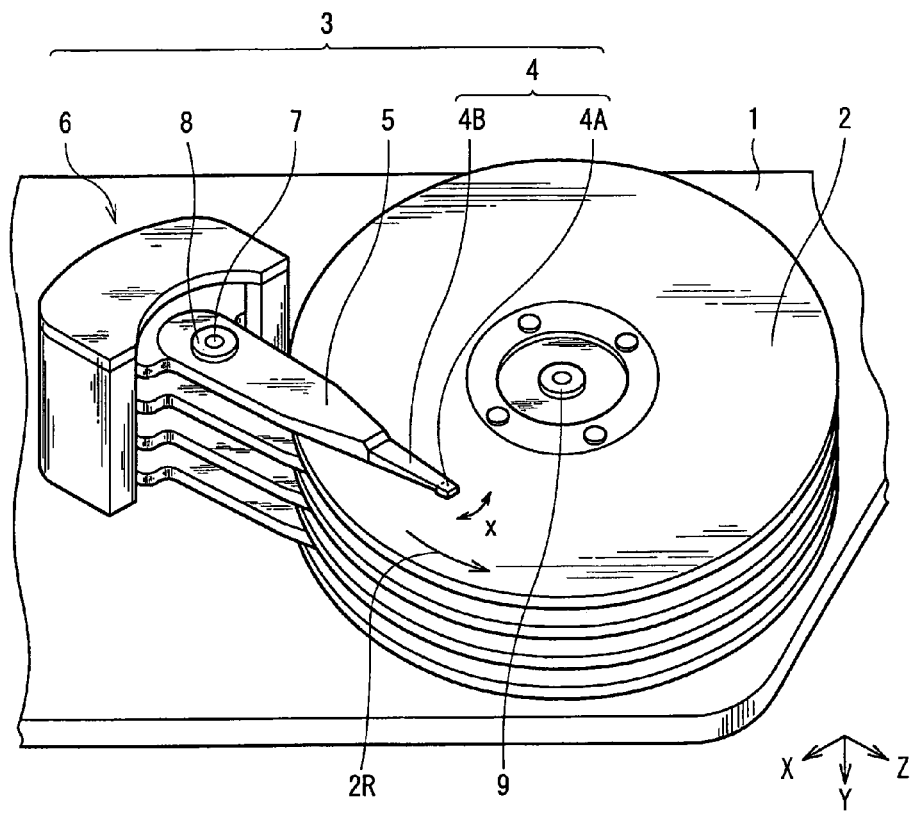
FIG. 1 is a perspective view illustrating a configuration of a magnetic disk device provided with a thermally-assisted magnetic head device according to an embodiment of the invention.

FIG. 1 is a perspective view illustrating an internal configuration of the magnetic disk device as the embodiment. The magnetic disk device adopts load/unload system as a driving system, and includes, inside of, the housing 1, a magnetic disk 2 as a magnetic recording medium in which information is to be written, and a head arm assembly (HAA) 3 for writing information in the magnetic disk 2 and reading the information. The HAA 3 is provided with a head gimbals assembly (HGA) 4, an arm 5 supporting a base of the HGA 4, and a driver 6 as a power source for rotating the arm 5. The HGA 4 includes a thermally-assisted magnetic head device (hereinafter, simply referred to as a "magnetic head device") 4A having a side surface provided with a magnetic read write head section 10 (described later) according to the embodiment, and a suspension 4B having an end portion provided with the magnetic head device 4A. The arm 5 supports the other end of the suspension 4B (an end portion opposite to the end portion provided with the magnetic head device 4A). The arm 5 is configured so as to be rotatable around a fixed shaft 7 fixed to the housing 1 through a bearing 8. The driver 6 is configured of, for example, a voice coil motor. Incidentally, the magnetic disk device has a plurality of (four in FIG. 1) magnetic disks 2, and the magnetic head device 4A is disposed corresponding to recording surfaces (a front surface and a back surface) of each of the magnetic disks 2. Each magnetic head device 4A is allowed to move in a direction across write tracks, that is, in a track width direction (in X-axis direction) in a plane parallel to the recording surface of each magnetic disk 2. On the other hand, the magnetic disk 2 is configured to rotate around a spindle motor 9 fixed to the housing 1 in a rotation direction 2R substantially orthogonal to the X-axis direction. With the rotation of the magnetic disk 2 and the movement of the magnetic head device 4A, information is written into the magnetic disk 2 or stored information is read out from the magnetic disk 2. Further, the magnetic disk device has a control circuit (described later) which controls a write operation and a read operation of the magnetic read write head section 10, and controls an emission operation of a laser diode as a light source which generates a laser beam used for thermally-assisted magnetic recording (described later).

Figure 2:
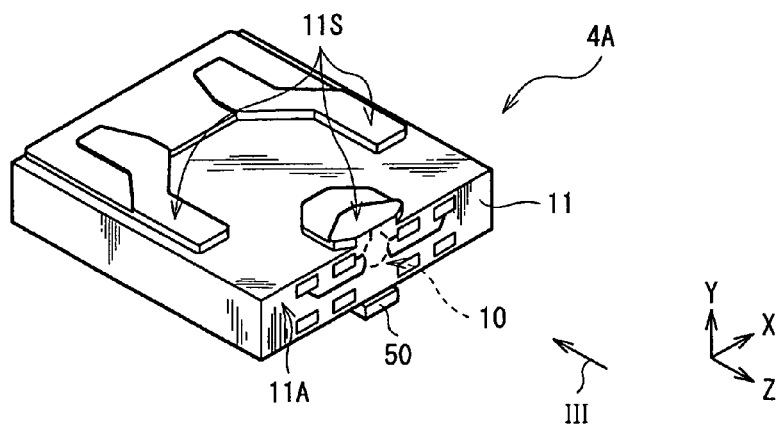
FIG. 2 is a perspective view illustrating a configuration of a slider in the magnetic disk device illustrated in FIG. 1.

FIG. 2 illustrates a configuration of the magnetic head device 4A illustrated in FIG. 1. The magnetic head device 4A has a block-shaped slider 11 made of, for example, $Al_2O_3.TiC$ (AlTiC). The slider 11 is substantially formed as a hexahedron, for example, and one surface thereof corresponds to an ABS 11S disposed oppositely and proximally to the recording surface of the magnetic disk 2. When the magnetic disk device is not driven, namely, when the spindle motor 9 is stopped and the magnetic disk 2 does not rotate, the magnetic head device 4A is pulled off to the position away from the magnetic disk 2 (unload state), in order to prevent contact of the ABS 11S and the recording surface. In contrast, when the magnetic disk device is initiated, the magnetic disk 2 starts to rotate at a high speed by the spindle motor 9, and the arm 5 is rotationally moved around the fixed shaft 7 by the driver 6. Therefore, the magnetic head device 4A moves above the front surface of the magnetic disk 2, and is in a load state. The rotation of the magnetic disk 2 at a high speed leads to air flow between the recording surface and the ABS 11S, and lift force caused by the air flow leads to a state where the magnetic head device 4A floats to maintain a certain distance (magnetic spacing) MS (in FIG. 5 described later) along a direction (Y-axis direction) orthogonal to the recording surface. In addition, on the element forming surface 11A that is one side surface orthogonal to the ABS 11S, the magnetic read write head section 10 is provided. Incidentally, on a surface 11B opposite to the ABS 11S of the slider 11, a light source unit 50 is provided near the magnetic read write head section 10.

[2. Detailed Configuration of Magnetic Read Write Head Section]

Figure 3:
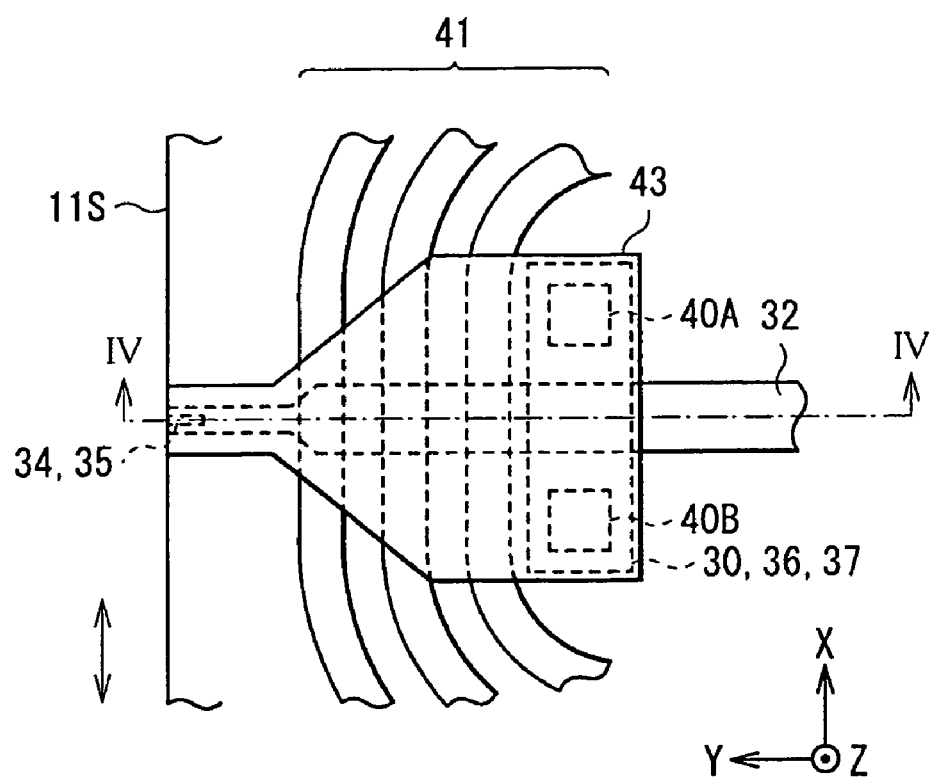
FIG. 3 is a plane view illustrating a main part of a magnetic read write head viewed from an arrow III direction illustrated in FIG. 2.
Figure 4:
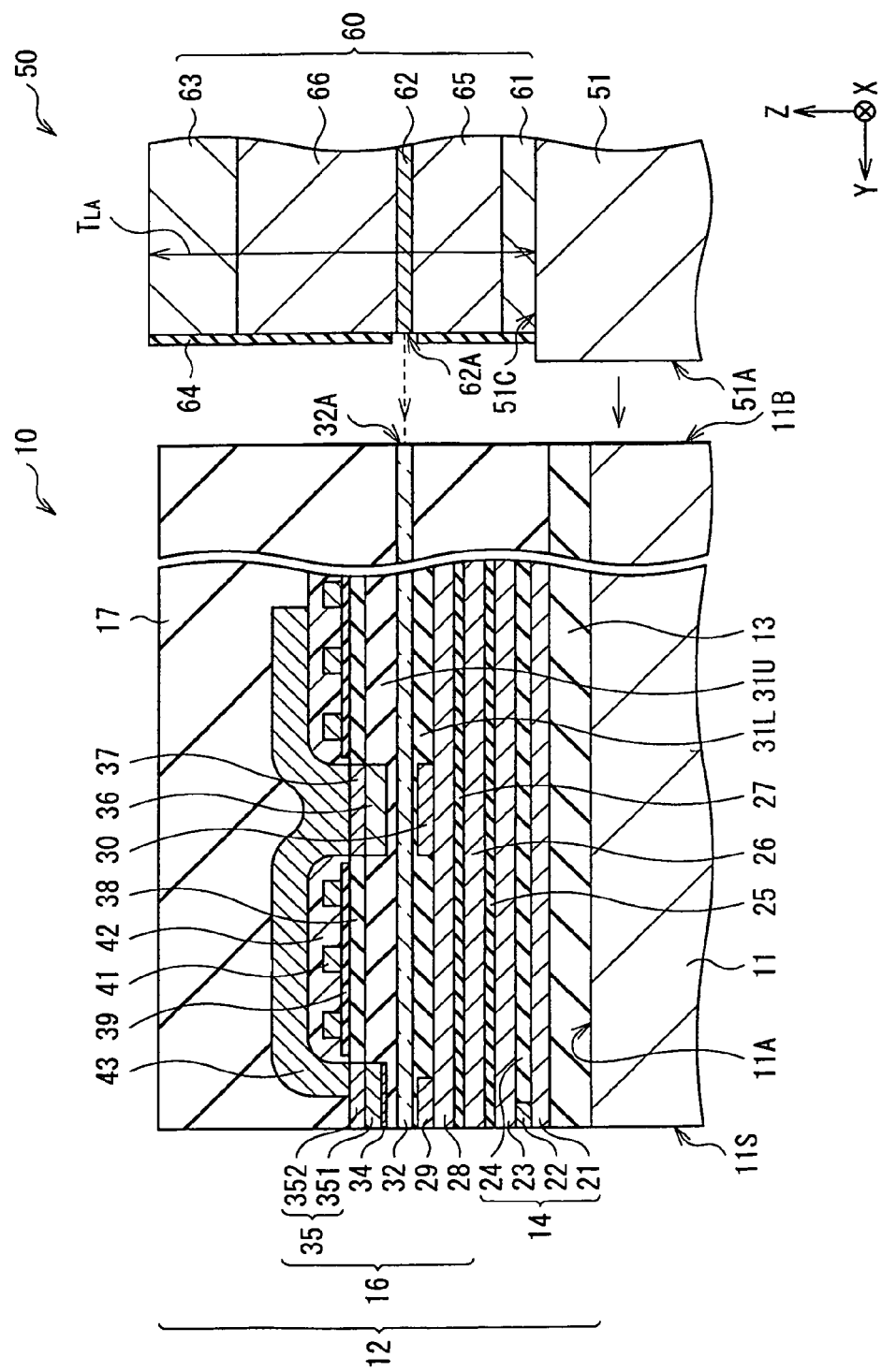
FIG. 4 is a sectional view illustrating a configuration of the magnetic read write head viewed from an arrow direction along a IV-IV line illustrated in FIG. 3.
Figure 5:
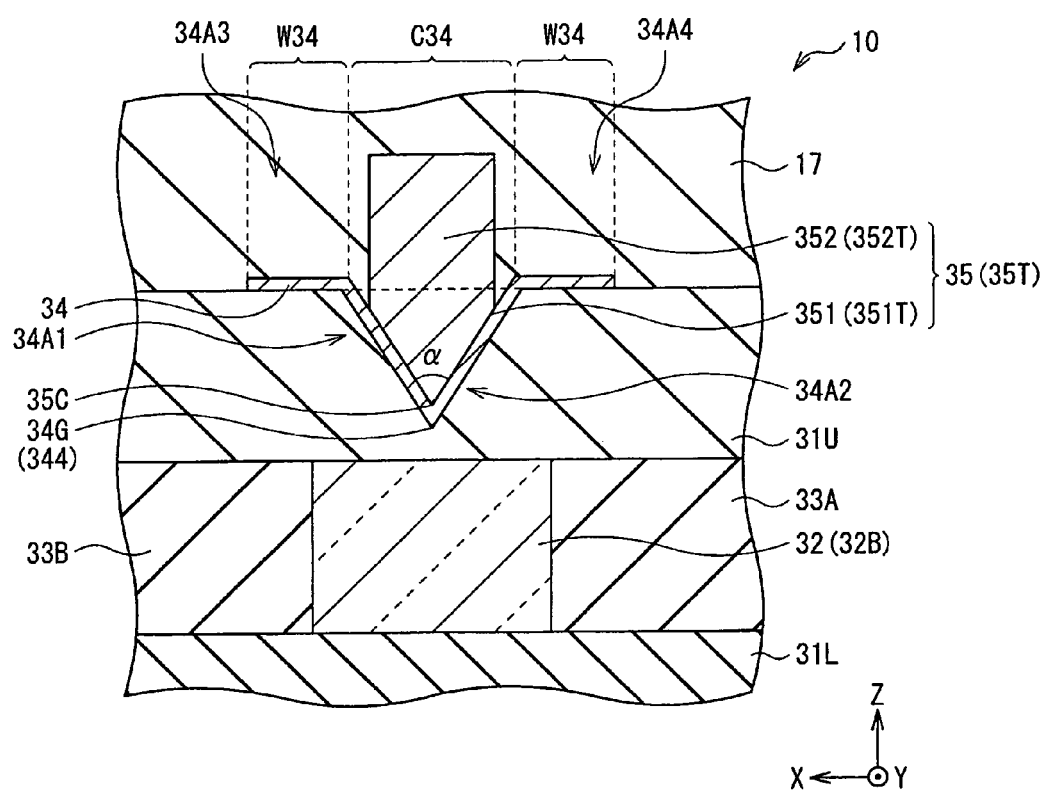
FIG. 5 is a plane view illustrating a configuration of an end surface exposed at an air bearing surface in a main part of the magnetic read write head.

Next, the magnetic read write head section 10 will be described in more detail with reference to FIGS. 3 to 5. FIG. 3 is a plane view of the magnetic read write head section 10 viewed from a direction of an arrow III illustrated in FIG. 2, FIG. 4 is a sectional view illustrating a configuration thereof in an arrow direction along a IV-IV line illustrated in FIG. 3, and FIG. 5 illustrates a part of an end surface exposed at the ABS 11S in an enlarged manner. The magnetic read write head section 10 has a stacked structure including an insulating layer 13, a read head section 14, a write head section 16, and a clad layer 17 which are embedded in an element forming layer 12 provided on the slider 11 and are stacked in order on the slider 11. Each of the read head section 14 and the write head section 16 has an end surface exposed at the ABS 11S.

The read head section 14 performs a read process using magneto-resistive effect (MR). The read head section 14 is configured by stacking, for example, a lower shield layer 21, an MR element 22, and an upper shield layer 23 in order on the insulating layer 13.

The lower shield layer 21 and the upper shield layer 23 are respectively formed of a soft magnetic metal material such as NiFe (nickel iron alloy), and are disposed to face each other with the MR element 22 in between in the stacking direction (in Z-axis direction). As a result, the lower shield layer 21 and the upper shield layer 23 each exhibit a function to protect the MR element 22 from the influence of unnecessary magnetic field.

One end surface of the MR element 22 is exposed at the ABS 11S, and the other surfaces thereof are in contact with an insulating layer 24 filling a space between the lower shield layer 21 and the upper shield layer 23. The insulating layer 24 is formed of an insulating material such as $Al_2O_3$ (aluminum oxide), AlN (aluminum nitride), $SiO_2$ (silicon dioxide), or DLC (diamond-like carbon).

The MR element 22 functions as a sensor for reading magnetic information written in the magnetic disk 2. Note that in the embodiment, in a direction (Y-axis direction) orthogonal to the ABS 11S, a direction toward ABS 11S with the MR element 22 as a base or a position near the ABS 11S is called "front side". A direction toward opposite side from the ABS 11S with the MR element 22 as a base or a position away from the ABS 11S is called "back side". The MR element 22 is a CPP (current perpendicular to plane)—GMR (giant magnetoresistive) element whose sense current flows inside thereof in a stacking direction. The lower shield layer 21 and the upper shield layer 23 each function as an electrode to supply the sense current to the MR element 22.

In the read head section 14 with such a structure, a magnetization direction of a free layer (not illustrated) included in the MR element 22 changes depending on a signal magnetic field from the magnetic disk 2. Thus, the magnetization direction of the free layer shows a change relative to a magnetization direction of a pinned layer (not illustrated) also included in the MR element 22. When the sense current is allowed to flow through the MR element 22, the relative change in the magnetization direction appears as the change of the electric resistance. Therefore, the read head section 14 detects the signal magnetic field using the change to read the magnetic information.

On the read head section 14, an insulating layer 25, an intermediate shield layer 26, and an insulating layer 27 are stacked in order. The intermediate shield layer 26 functions to prevent the MR element 22 from being affected by a magnetic field which is generated in the write head section 16, and is formed of, for example, a soft magnetic metal material such as NiFe. The insulating layers 25 and 27 are formed of the similar material to the insulating layer 24.

The write head section 16 is a vertical magnetic recording head performing a recording process of thermally-assisted magnetic recording system. The write head section 16 has, for example, a lower yoke layer 28, a leading shield 29 and a connecting layer 30, a clad 31L, a waveguide 32, clads 33A and 33B, and a clad 31U in order on the insulating layer 27. The clads 33A and 33B configure a first clad pair sandwiching the waveguide 32 in the direction across tracks (in the X-axis direction). On the other hand, the clads 31L and 31U configure a second clad pair sandwiching the waveguide 32 in the thickness direction (in the Z-axis direction). Note that the leading shield 29 may be omitted from the structure.

The waveguide 32 is made of a dielectric material allowing a laser beam to pass therethrough. Examples of the constituent material of the waveguide 32 include SiC, DLC, TiOx (titanium oxide), TaOx (tantalum oxide), SiNx (silicon nitride), SiOxNy (silicon oxynitride), Si (silicon), ZnSe (zinc selenide), NbOx (niobium oxide), GaP (gallium phosphide), ZnS (zinc sulfide), ZnTe (zinc telluride), CrOx (chromium oxide), FeOx (iron oxide), CuOx (copper oxide), SrTiOx (strontium titanate), BaTiOx (barium titanate), Ge (germanium), and C (diamond). The clads 33A, 33B, 31L, and 31U are made of a dielectric material having a refractive index with respect to a laser beam propagating through the waveguide 32, lower than that of a constituent material of the waveguide 32. In terms of the refractive index with respect to a laser beam propagating through the waveguide 32, the dielectric material constituting the clads 33A and 33B and the dielectric material constituting the clads 31L and 31U may be the same or different from each other. Examples of the dielectric material constituting the clads 33A, 33B, 31L, and 31U include SiOx (silicon oxide), $Al_2O_3$ (aluminum oxide), and AlN (aluminum nitride).

The lower yoke layer 28, the leading shield 29, and the connecting layer 30 each are made of a soft magnetic metal material such as NiFe. The leading shield 29 is located at the frontmost end of the upper surface of the lower yoke layer 28 so that one end surface of the leading shield 29 is exposed at the ABS 11S. The connecting layer 30 is located backward of the leading shield 29 on the upper surface of the lower yoke layer 28. The clad 31L is made of a dielectric material having a refractive index, with respect to a laser light propagating through the waveguide 32, lower than that of the waveguide 32, and is provided to cover the lower yoke layer 28, the leading shield 29, and the connecting layer 30. The waveguide 32 provided on the clad 31L extends in a direction (Y-axis direction) orthogonal to the ABS 11S, one end surface of the waveguide 32 is exposed at the ABS 11S, and the other end surface is exposed at the backward thereof. Note that the front end surface of the waveguide 32 may be located at a receded position from the ABS 11S without being exposed at the ABS 11S. In the waveguide 32, the shape of a section surface parallel to the ABS 11S is, for example, a rectangular shape, but may be the other shapes.

The write head section 16 further includes a plasmon generator 34 provided above the front end of the waveguide 32 through the clad 31U, and a magnetic pole 35 provided to be in contact with the upper surface of the plasmon generator 34. The plasmon generator 34 and the magnetic pole 35 are arranged so that one end surface of each of the plasmon generator 34 and the magnetic pole 35 is exposed at the ABS 11S. The magnetic pole 35 has a structure in which a first layer 351 and a second layer 352 are stacked in order on the plasmon generator 34, for example. Both the first layer 351 and the second layer 352 are configured of a magnetic material with high saturation flux density such as iron-based alloy. Examples of the iron-based alloy include FeCo (iron cobalt alloy), FeNi (iron nickel alloy), and FeCoNi (iron cobalt nickel alloy). The plasmon generator 34 generates near-field light NF (described later) from the ABS 11S, based on the laser beam which has propagated through the waveguide 32. The magnetic pole 35 stores therein magnetic flux generated in a coil 41 (described later), releases the magnetic flux from the ABS 11S, thereby generating a write magnetic field for writing magnetic information into the magnetic disk 2. The plasmon generator 34 and the first layer 351 are embedded in the clad layer 33.

The write head section 16 further includes a connecting layer 36 embedded in the clad 31U at the backward of the plasmon generator 34 and the magnetic pole 35, and a connecting layer 37 provided to be in contact with the upper surface of the connecting layer 36. Both the connecting layers 36 and 37 are arranged above the connecting layer 30 and are formed of a soft magnetic metal material such as NiFe.

The write head section 16 includes two connecting sections 40A and 40B (FIG. 3) which are embedded in the clads 31U, 33A, and 33B. The connecting sections 40A and 40B are also formed of a soft magnetic metal material such as NiFe. The connecting sections 40A and 40B extend in the Z-axis direction so as to connect the connecting layer 30 and the connecting layer 36, and are arranged in X-axis direction so as to sandwich the waveguide 32 with a distance.

As illustrated in FIG. 4, on the clad 31U, an insulating layer 38 is provided to fill a space around the second layer 352 of the magnetic pole 35. An insulating layer 39 and the coil 41 which is formed in spiral around the connecting layer 37 are stacked in order on the insulating layer 38. The coil 41 is intended to generate magnetic flux for writing by flow of a write current, and is formed of a high conductive material such as Cu (copper) and Au (gold). The insulating layers 38 and 39 are configured of an insulating material such as $Al_2O_3$, AlN, $SiO_2$ or DLC. The insulating layers 38 and 39 and the coil 41 are covered with an insulating layer 42, and an upper yoke layer 43 is further provided to cover the insulating layer 42. The insulating layer 42 is configured of, for example, a non-magnetic insulating material flowing on heating, such as a photoresist or a spin on glass (SOG). The insulating layers 38, 39, and 42 electrically separate the coil 41 from other nearby devices. The upper yoke layer 43 is formed of a soft magnetic material with high saturation flux density such as CoFe, the front portion thereof is connected to the second layer 352 of the magnetic pole 35, and a part of the rear portion is connected to the connecting layer 37. In addition, the front end surface of the upper yoke layer 43 is located at a receded position from the ABS 11S.

In the write head section 16 with such a structure, by the write current flowing through the coil 41, magnetic flux is generated inside a magnetic path which is mainly configured by the leading shield 29, the lower yoke layer 28, the connecting layer 30, the connecting sections 40A and 40B, the connecting layers 36 and 37, the upper yoke layer 43, and the magnetic pole 35. Accordingly, a signal magnetic field is generated near the end surface of the magnetic pole 35 exposed at the ABS 11S, and the signal magnetic field reaches a predetermined region of the recording surface of the magnetic disk 2.

Further, in the magnetic read write head section 10, the clad 17 made of similar material to the clad 31U is formed to cover the entire upper surface of the write head section 16.

Figure 6:
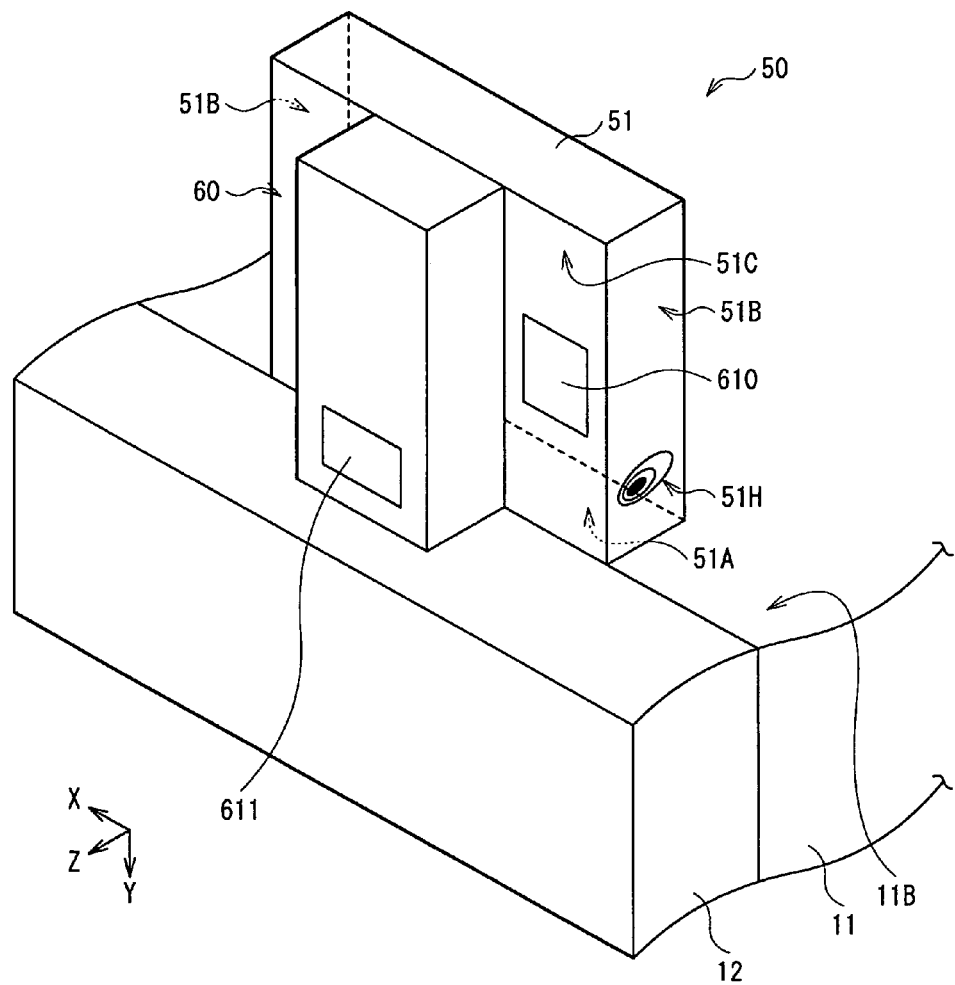
FIG. 6 is a perspective view illustrating a general configuration of a whole light source unit illustrated in FIG. 1.

The light source unit 50 provided at the backward of the magnetic read write head section 10 includes a laser diode 60 as a light source emitting a laser beam, and a rectangular-solid supporting member 51 supporting the laser diode 60, as illustrated in FIG. 6. Incidentally, FIG. 6 is a perspective view illustrating a general configuration of the whole light source unit 50.

The supporting member 51 is formed of, for example, a ceramic material such as $Al_2O_3$.TiC. As illustrated in FIG. 4, the supporting member 51 includes a bonding surface 51A to be adhered to a back surface 11B of the slider 11, and a light source mounting surface 51C orthogonal to the bonding surface 51A. The light source mounting surface 51C is parallel to the element forming surface 11A, and the laser diode 60 is mounted on the light source mounting surface 51C. Note that an irradiation trace 51H is formed by irradiation of a laser beam on a pair of side surfaces 51B (refer to FIG. 6) orthogonal to both the bonding surface 51A and the light source mounting surface 51C. The irradiation trace 51H is a concave section whose depth is increased with decreasing a distance from the light source mounting surface 51C. The supporting member 51 desirably has a function of a heatsink dissipating heat generated by the laser diode 60, in addition to the function to support the laser diode 60.

Laser diodes generally used for communication, for optical disc storage, or for material analysis, for example, InP-based, GaAs-based, or GaN-based laser diodes, may be used as the laser diode 60. The wavelength of the laser beam emitted from the laser diode 60 may be any value within the range of, for example, 375 nm to 1.7 µm. Specifically, examples of such a laser diode include a laser diode of InGaAsP/InP quaternary mixed crystal with the emission wavelength region of 1.2 to 1.6 µm. As illustrated in FIG. 4, the laser diode 60 has a multilayer structure including a lower electrode 61, an active layer 62, and an upper electrode 63. For example, an n-type semiconductor layer 65 including n-type AlGaN is inserted between the lower electrode 61 and the active layer 62, and for example, a p-type semiconductor layer 66 including p-type AlGaN is inserted between the active layer 62 and the upper electrode 63. On each of two cleavage surfaces of the multilayer structure, a reflective layer 64 formed of $SiO_2$, $Al_2O_3$, or the like is provided to totally reflect light and excite oscillation. In the reflective layer 64, an aperture for emitting a laser beam is provided at a position including an emission center 62A of the active layer 62. The relative positions of the light source unit 50 and the magnetic read write head section 10 are fixed by adhering the bonding surface 51A of the supporting member 51 to the back surface 11B of the slider 11 so that the emission center 62A and the rear end surface 32A of the waveguide 32 are coincident with each other. The thickness $T_{LA}$ of the laser diode 60 is, for example, within a range of about 60 to 200 µm. A predetermined voltage is applied between the lower electrode 61 and the upper electrode 63 so that a laser beam is emitted from the emission center 62A of the active layer 62, and then enters the rear end surface 32A of the waveguide 32. The laser beam emitted from the laser diode 60 is preferably polarized light of TM mode whose electric field oscillates in a direction perpendicular to the surface of the active layer 62. The laser diode 60 may be driven with use of a power source in the magnetic disk device. The magnetic disk device generally includes a power source generating a voltage of about 2 V, for example, and the voltage generated by the power source is sufficient to drive the laser diode 60. In addition, the laser diode 60 consumes power of about several tens mW, which may be sufficiently covered by the power source in the magnetic disk device.

Figure 7:
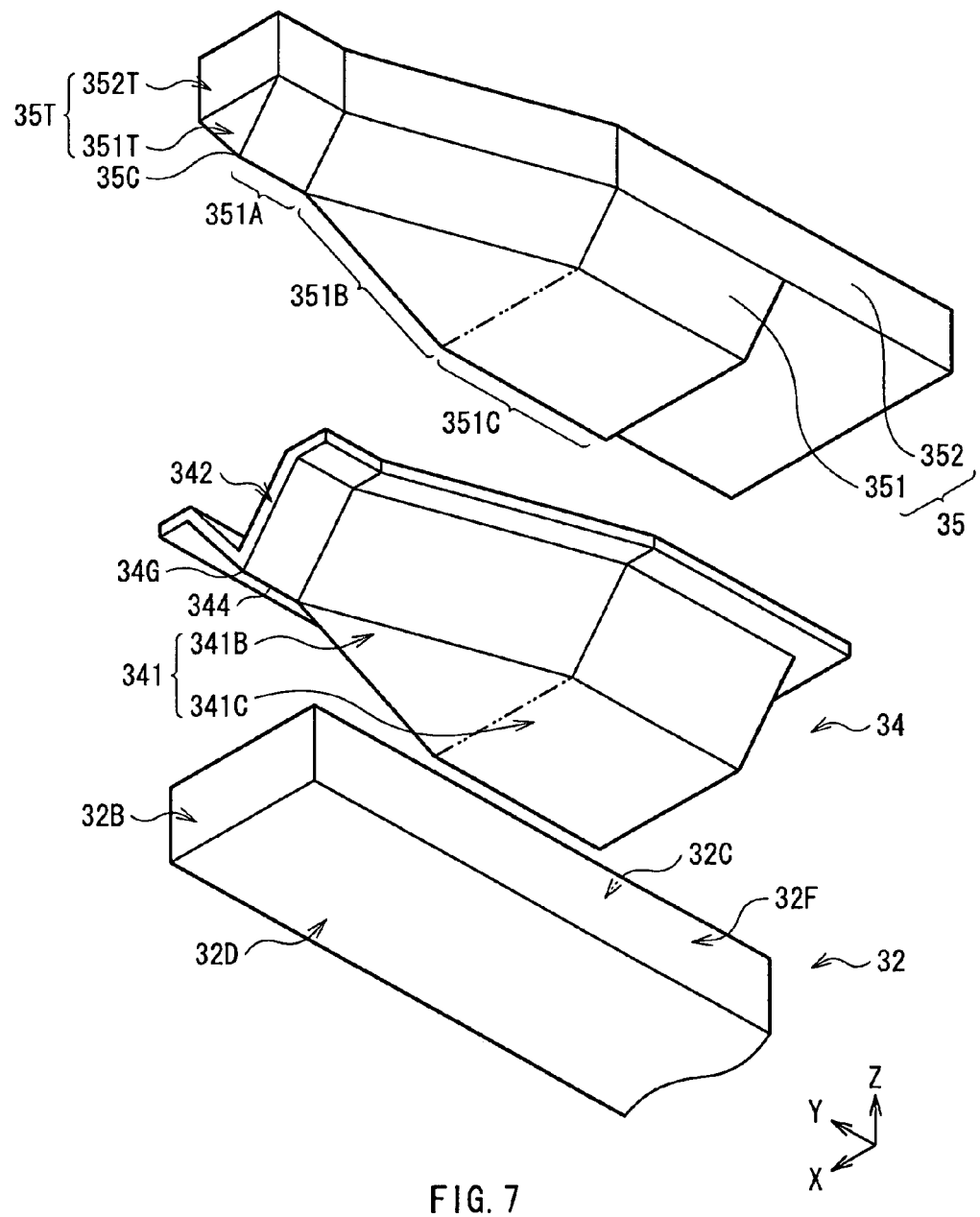
FIG. 7 is an exploded perspective view illustrating a configuration of the main part of the magnetic read write head.
Figure 8:
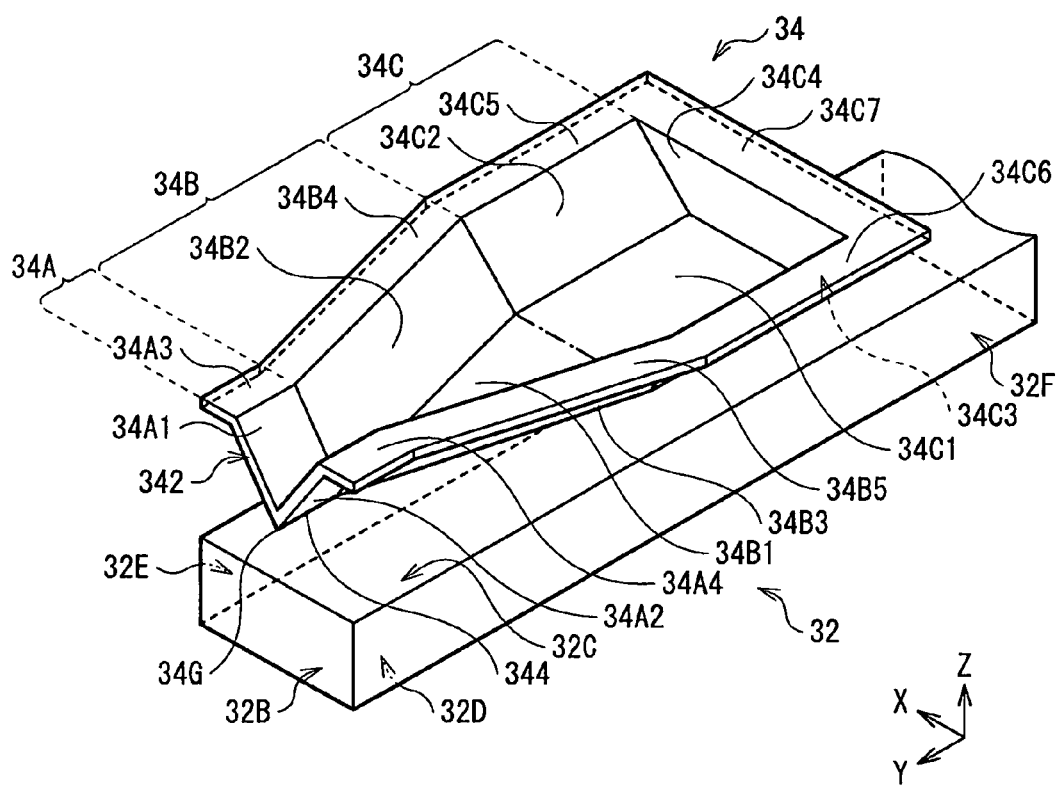
FIG. 8 is another perspective view illustrating a configuration of the main part of the magnetic read write head.
Figure 9:
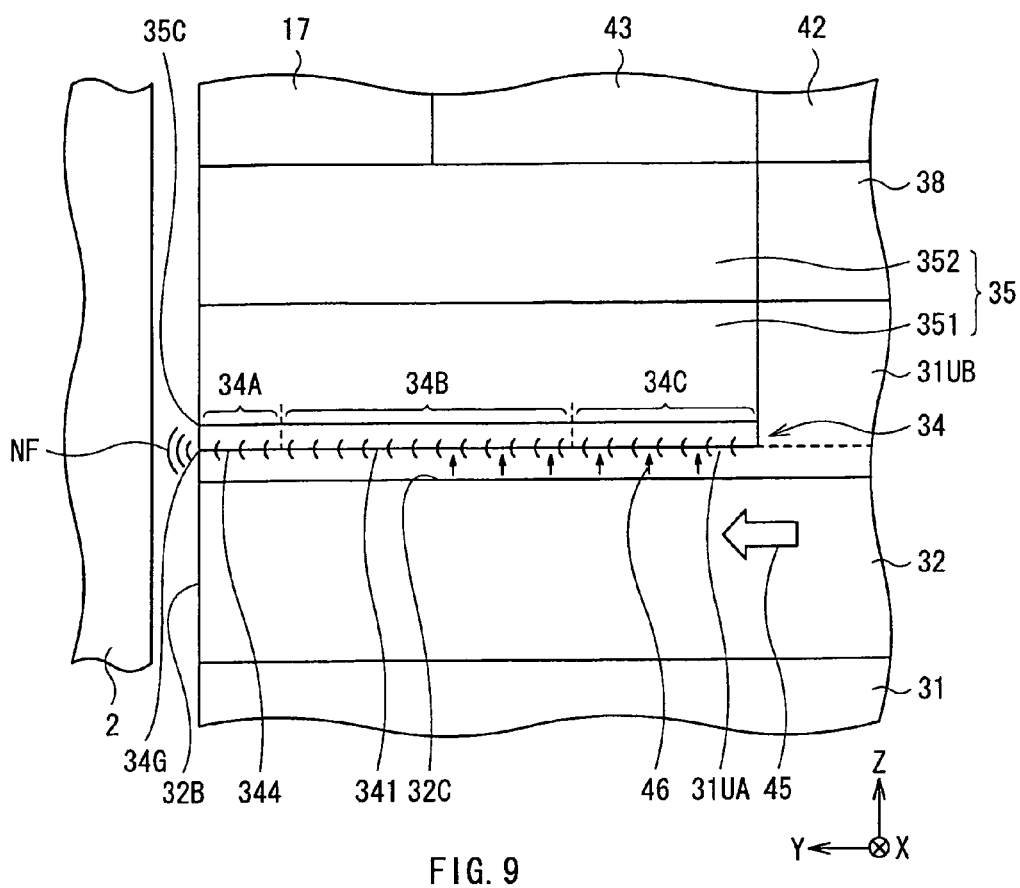
FIG. 9 is a sectional view illustrating a configuration of a section surface, which is orthogonal to the air bearing surface, of the main part of the magnetic read write head.
Figure 10:
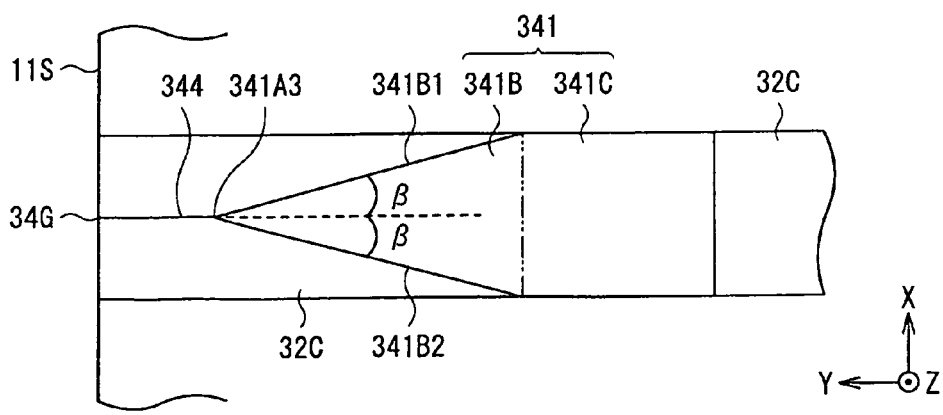
FIG. 10 is a plane view illustrating the main part of the magnetic read write head.

Next, referring to FIGS. 7 to 10 in addition to FIG. 5, the structure and the functions of each of the waveguide 32, the plasmon generator 34, and the magnetic pole 35 will be described in detail. FIG. 7 is an exploded perspective view illustrating the structures of the waveguide 32, the plasmon generator 34, and the magnetic pole 35, and FIG. 8 is a perspective view illustrating shapes and positional relationship of the waveguide 32 and the plasmon generator 34. FIG. 9 is a sectional view illustrating the structures and the functions of the waveguide 32, the plasmon generator 34, and the magnetic pole 35, and the section surface is orthogonal to the ABS 11S. FIG. 10 is a plane view illustrating the main part of the plasmon generator 34 viewed from the upper side.

As illustrated in FIG. 8, for example, the waveguide 32 includes an end surface 32B closer to the ABS 11S, an evanescent light generating surface 32C as an upper surface, a lower surface 32D, and two side surfaces 32E and 32F, besides the rear end surface 32A illustrated in FIG. 4. The evanescent light generating surface 32C generates evanescent light based on the laser beam propagating through the waveguide 32. In FIGS. 7 to 10, although the end surface 32B arranged on the ABS 11S is exemplified, the end surface 32B may be arranged at a position away from the ABS 11S.

As illustrated in FIG. 8, the plasmon generator 34 has a first portion 34A, a second portion 34B, and a third portion 34C in order from the ABS 11S side. In FIG. 8, the boundary between the second portion 34B and the third portion 34C is indicated by a dashed line. Examples of the constituent material of the plasmon generator 34 include a conductive material including one or more of Pd (palladium), Pt (platinum), Rh (rhodium), Ir (iridium), Ru (ruthenium), Au (gold), Ag (silver), Cu (copper), and Al (aluminum). Here, the constituent materials of the lower layer 34L and the upper layer 34U may be the same kind or different kinds.

As illustrated in FIG. 5, the first portion 34A has a V-shaped mid-portion C34 including an edge 344 which is projected toward the waveguide on a section surface parallel to the ABS 11S, and a pair of wing portions W34 facing to each other with the mid-portion C34 in between in the direction across tracks (X-axis direction). Note that the shape of the section surface of the first portion 34A parallel to the ABS 11S is not changed regardless of the distance from the ABS 11S.

A V-shaped groove is provided in the mid-portion C34 of the first portion 34A. In other words, a pair of sidewalls 34A1 and 34A2 which respectively extend in a direction orthogonal to the ABS 11S is connected with each other at the edge 344 so as to form a V-shape having a vertex angle $\alpha$ on a section surface parallel to the ABS 11S. To increase the generation efficiency of the near-field light, the vertex angle $\alpha$ is preferably within a range of approximately 55 to 75°, for example. The edge 344 is a boundary portion between the pair of the sidewalls 34A1 and 34A2, and extends in the Y-axis direction from a pointed edge 34G exposed at the ABS 11S as a base point to the second portion 34B. The pointed edge 34G is a portion generating the near-field light. The edge 344 faces the evanescent light generating surface 32C of the waveguide 32, and the sidewalls 34A1 and 34A2 are tilted so that the relative distance therebetween in X-axis direction becomes wider with increasing distance from the waveguide 32 with the edge 344 being a base point.

In the wing portions W34 of the first portion 34A, a pair of fringes 34A3 and 34A4 is provided so that one end of each of the fringes 34A3 and 34A4 in the X-axis direction is connected to an end portion on the opposite side from the edge 344 of the sidewalls 34A1 and 34A2, respectively. For example, the pair of the fringes 34A3 and 34A4 extends along a plane (XY-plane) orthogonal to the ABS 11S and parallel to the X-axis direction. The sidewalls 34A1 and 34A2 and the fringes 34A3 and 34A4 have a front end surface 342 exposed at the ABS 11S (FIG. 7 and FIG. 8). The first portion 34A has a substantially uniform thickness over the mid-portion C34 and the pair of wing portions W34.

As illustrated in FIG. 8, the second portion 34B has a plate-like bottom portion 34B1 facing the evanescent light generating surface 32C, two plate-like sidewalls 34B2 and 34B3, and fringes 34B4 and 34B5. The bottom portion 34B1 is configured so that the width in the X-axis direction is zero at the boundary portion with the first portion 34A, and becomes wider with increasing distance from the ABS 11S. The sidewalls 34B2 and 34B3 are provided upright, at both end edge of the bottom portion 34B1 in the X-axis direction, toward the side opposite to the waveguide 32. Here, the sidewalls 34B2 and 34B3 are tilted so that the relative distance (a distance in the X-axis direction) therebetween becomes wider with increasing distance from the waveguide 32 with the portion connected to the bottom portion 34B1 being a base point. In addition, the sidewalls 34B2 and 34B3 are connected to the sidewalls 34A1 and 34A2 of the first portion 34A, respectively. Further, the fringes 34B4 and 34B5 are connected to an end portion opposite to the bottom portion 34B1 of the sidewalls 34B2 and 34B3, respectively, and also connected to the fringes 34A3 and 34A4 of the first portion 34A, respectively. Moreover, in the sidewalls 34B2 and 34B3 and the fringes 34B4 and 34B5, the section surfaces orthogonal to the corresponding extending direction preferably have the similar shapes to those of the section surfaces of the sidewalls 34A1 and 34A2 and the fringes 34A3 and 34A4 of the first portion 34A, respectively.

The third portion 34C includes a bottom portion 34C1, sidewalls 34C2 and 34C3, a wall 34C4, and fringes 34C5, 34C6, and 34C7. The bottom portion 34C1 is provided so as to extend continuously from the bottom portion 34B1 of the second portion 34B in the XY-plane. The sidewalls 34C2 and 34C3 are respectively connected to the sidewalls 34B2 and 34B3 of the second portion 34B, and extend to be orthogonal to the ABS 11S. The sidewalls 34C2 and 34C3 are tilted so that the relative distance (the distance in the X-axis direction) therebetween becomes wider with increasing distance from the waveguide 32, with the connecting portion to the bottom portion 34C1 being a base point. The wall 34C4 couples the bottom portion 34C1 and the rear end portion of each of the sidewalls 34C2 and 34C3. The fringes 34C5 and 34C6 are respectively coupled to the fringes 34B4 and 34B5 of the second portion 34B, and extend to be orthogonal to the ABS 11S. The fringe 34C7 couples the fringes 34C5 and 34C6 and the rear end portion of the wall 34C4. The section surface of each of the sidewalls 34C2 and 34C3 and the fringes 34C5 and 34C6, which is orthogonal to the corresponding extending direction, preferably have the similar shape to that of the section surface of each of the sidewalls 34A1 and 34A2 and the fringes 34A3 and 34A4 of the first portion 34A, for example. Note that the wall 34C4 and the fringe 34C7 may not be provided.

As illustrated in FIG. 7 and FIG. 8, the first portion 34A, the second portion 34B, and the third portion 34C form a space inside thereof for containing the first layer 351 of the magnetic pole 35.

The surfaces of the bottom portions 34B1 and 34C1 facing the evanescent light generating surface 32C of the waveguide 32 with a predetermined distance are a first surface 341B and a second surface 341C which form a surface plasmon exciting surface 341 as illustrated in FIG. 7. In FIG. 7, the boundary between the first surface 341B and the second surface 341C is indicated by a two-dot chain line.

The magnetic pole 35 has an end surface 35T exposed at the ABS 11S as illustrated in FIG. 6 and FIG. 7. The end surface 35T includes an end surface 351T exposed at the ABS 11S in the first layer 351, and an end surface 352T exposed at the ABS 11S in the second layer 352.

The first layer 351 of the magnetic pole 35 is contained in a space formed by the first portion 34A, the second portion 34B, and the third portion 34C of the plasmon generator 34. Specifically, the first layer 351 has a first portion 351A occupying a space formed by the first portion 34A, a second portion 351B occupying a space formed by the second portion 34B, and a third portion 351C occupying a space formed by the third portion 34C. The first portion 351A has a triangular prism shape closely contacting the sidewalls 34A1 and 34A2 of the first portion 34A of the plasmon generator 34, and the area of the section surface parallel to the ABS 11S is constant. In the X-axis direction, the width of the first portion 351A is desirably smaller than that of the end surface 32B of the waveguide 32. Furthermore, the width of the first portion 351A is desirably smaller than that of the mid-portion C34 of the first portion 34A. This is because the maximum intensity of the write magnetic field from the magnetic pole 35 is increased in both cases. The end surface 351T of the first portion 351A has a pointed edge 35C located at a vertex opposite to the second layer 352.

The second portion 351B is closely contacted with the sidewalls 34B2 and 34B3 and the bottom portion 34B1 of the second portion 34B of the plasmon generator 34. The width of the second portion 351B becomes wider with increasing the distance from the ABS 11S in the X-axis direction, and becomes wider with increasing the distance from the waveguide 32 in the Z-axis direction. The third portion 351C is closely contacted with the sidewalls 34C2 and 34C3 and the bottom portion 34C1 of the third portion 34C of the plasmon generator 34. The width of the third portion 351C in X-axis direction is constant in Y-axis direction, and becomes wider with increasing the distance from the waveguide 32 in Z-axis direction.

As illustrated in FIG. 9, in the clad 31U, a portion disposed between the evanescent light generating surface 32C and the surface plasmon exciting surface 341 is a buffer portion 31UA. In the clad 31U, a portion located backward of the plasmon generator 34 and the first layer 351 is a rear portion 31UB.

FIG. 10 is a plane view illustrating a positional relationship between the surface plasmon exciting surface 341 and the evanescent light generating surface 32C, and illustrates the plasmon generator 34 and the waveguide 32 viewed from the magnetic pole 35 side. However, as for the plasmon generator 34, only a surface facing the evanescent light generating surface 32C is illustrated, and the other surfaces are omitted in illustration. As illustrated in FIG. 10, the width of the first surface 341B in X-axis direction becomes smaller toward the ABS 11S. The first surface 341B has a front end portion 341A3 at a position where end edges 341B1 and 341B2 in the X-axis direction intersect with each other. Angles β formed by the end edges 341B1 and 341B2 with respect to a direction (Y-axis direction) perpendicular to the ABS 11S are equal to each other. The angle β is within a range of 3 to 50 degrees, for example, and in particular, preferably within a range of 10 to 25 degrees.

[3. Method of Manufacturing Magnetic Head Device]

In addition to FIG. 4, referring to FIGS. 11 to 16, the method of manufacturing the magnetic head device 4A will be described. FIGS. 11 to 16 are perspective views each illustrating a process in the method of manufacturing the magnetic head device 4A. In addition to that, an alignment device will also be described.

(3-1. Method of Manufacturing Magnetic Read Write Head Section)

Figure 11:
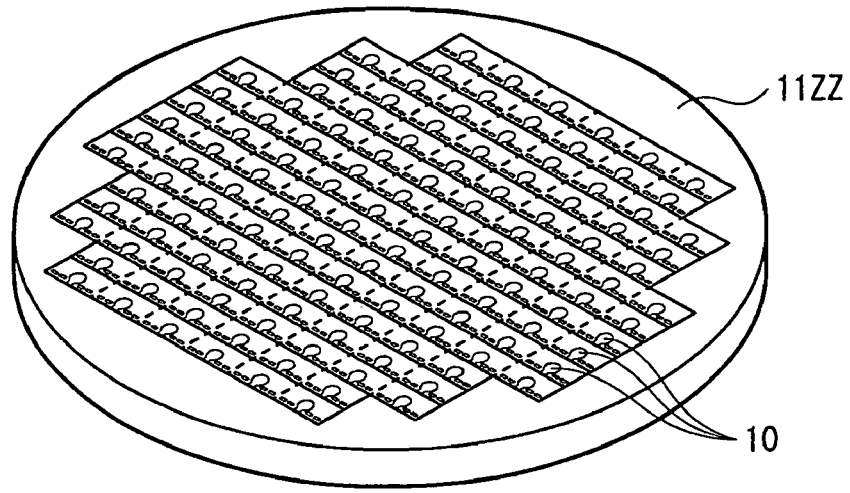
FIG. 11 is a perspective view illustrating a process in a method of manufacturing the magnetic head device illustrated in FIG. 1.

First, as illustrated in FIG. 11, a wafer 11ZZ made of, for example, AlTiC is provided. The wafer 11ZZ is to be a plurality of sliders 11 eventually. After that, a plurality of magnetic read write head section 10 is formed in an array on the wafer 11ZZ as described below.

The magnetic read write head section 10 is mainly manufactured by subsequently forming and stacking a series of components by using an existing thin film process. Examples of the existing thin film process include a film forming technique such as an electrolytic plating method and a sputtering method, patterning technique such as a photolithography method, etching technique such as dry etching method and wet etching method, and polishing technique such as chemical mechanical polishing (CMP).

Herein, first, the insulating layer 13 is formed on the slider 11. Next, the lower shield layer 21, the MR element 22 and the insulating layer 24, and the upper shield layer 23 are formed by stacking in this order on the insulating layer 13 to form the read head section 14. Subsequently, the insulating layer 25, the intermediate shield layer 26, and the insulating layer 27 are stacked in order on the read head section 14.

After that, the lower yoke layer 28, the leading shield 29 and the connecting layer 30, the clad 31L, the waveguide 32, the clads 33A and 33B, the clad 31U, the plasmon generator 34, the magnetic pole 35, and the connecting layers 36 and 37 are formed in order on the insulating layer 27. Note that the formation of the leading shield 29 may be omitted. Further, by performing a planarization treatment after the insulating layer 38 is formed to cover the entire surface, the upper surfaces of the magnetic pole 35, the insulating layer 38, and the connecting layer 37 are planarized. Subsequently, the coil 41 embedded by the insulating layers 39 and 42 is formed. Moreover, the upper yoke layer 43 connected with the magnetic pole 35 and the connecting layer 37 is formed to complete the write head section 16. After that, the clad layer 17 is formed on the write head section 16, and by using CMP or the like, the side surface of the stacked structure from the slider 11 to the clad layer 17 is totally polished to form the ABS 11S. As a result, the plurality of magnetic read write head sections 10 is formed in an array on the wafer 11ZZ (FIG. 11).

Figure 12:
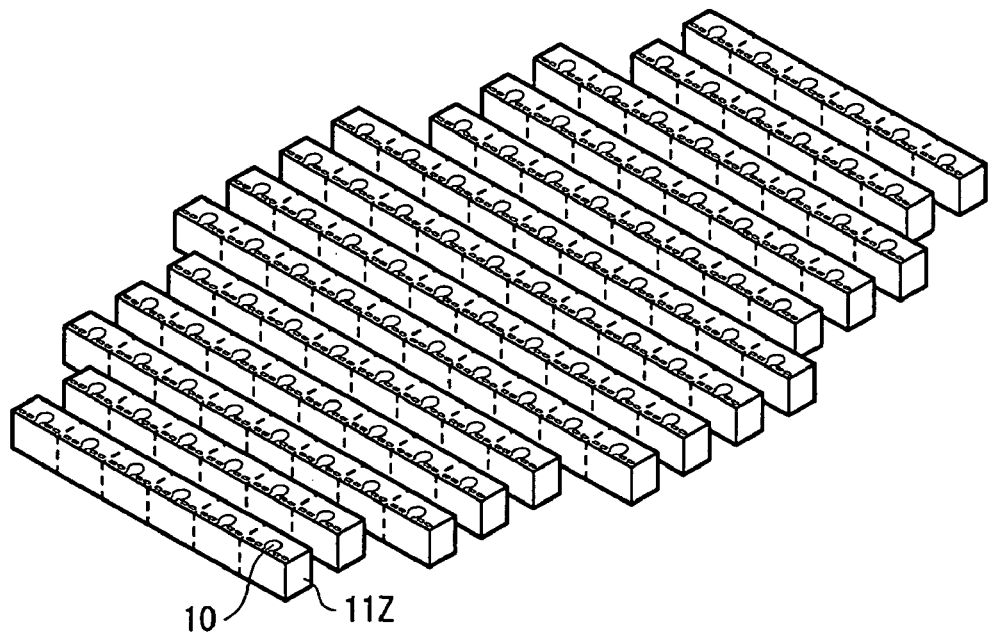
FIG. 12 is a perspective view illustrating a process following the process of FIG. 11.

After that, as illustrated in FIG. 12, the wafer 11ZZ is cut to form a plurality of bars 11Z. The plurality of magnetic read write head sections 10 is formed in line in each bar 11Z. Further, one side surface of the bar 11Z is mechanically polished, and is then etched selectively by using the photolithography method or the like to form the ABS 11S.

(3-2. Method of Bonding Slider to Light Source Unit)

Figure 13:
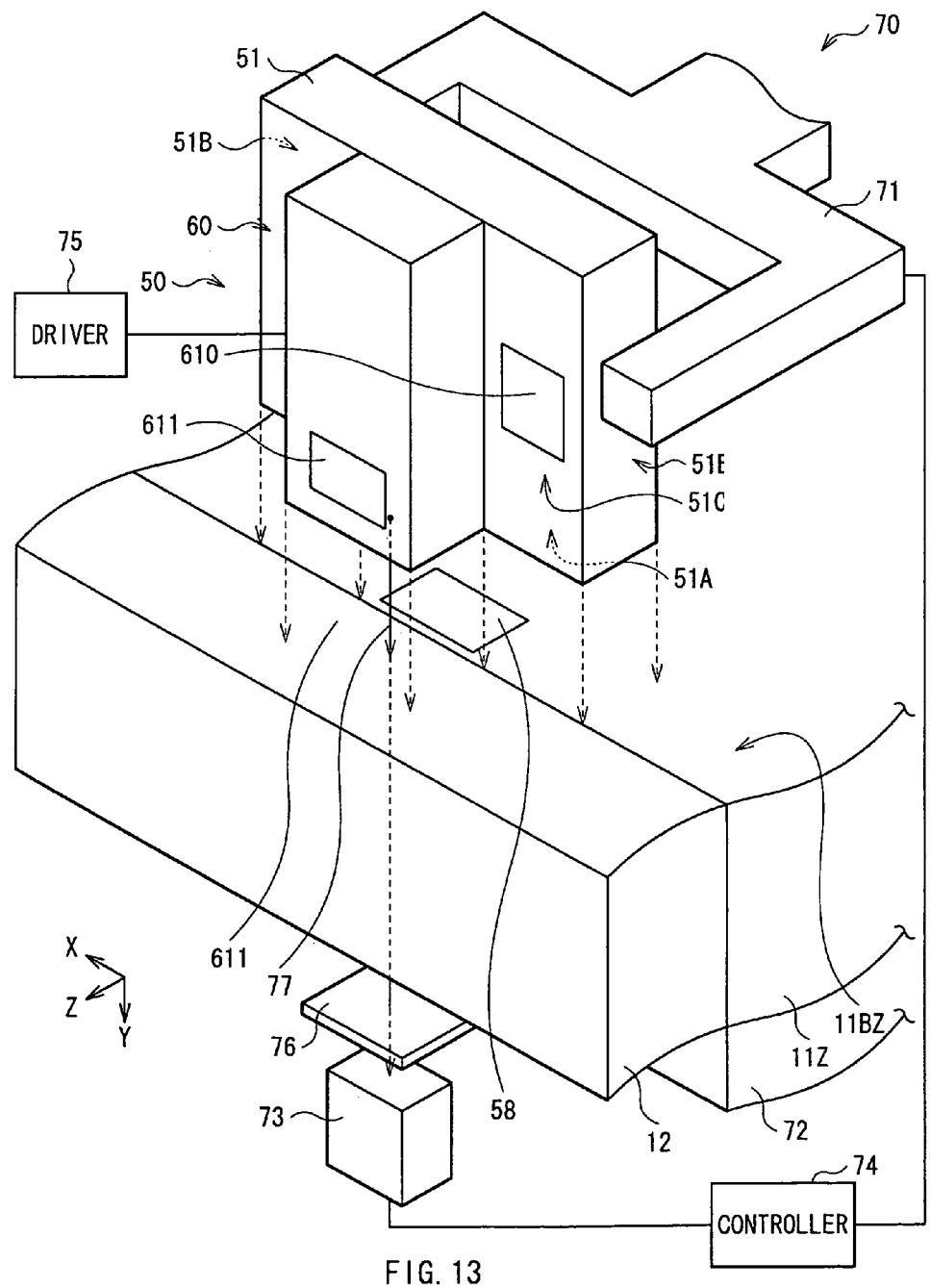
FIG. 13 is a perspective view illustrating a process following the process of FIG. 12.

Next, the light source unit 50 is provided to be bonded to the bar 11Z at respective predetermined positions with use of the alignment apparatus 70 as described below (refer to FIG. 13). The alignment apparatus 70 includes a probe 71, a tray 72, a photo-reception device 73, a controller 74, and a driver 75. The probe 71 is a hold section holding the light source unit 50, and the tray 72 is mounted with the bar 11Z which is divided into the plurality of sliders 11 later. The controller 74 functions to allow the relative position between the light source unit 50 held by the probe 71 and the bar 11Z mounted on the tray 72 to be moved. The driver 75 drives the laser diode 60 to control output thereof. The driver 75 controls the drive current to be supplied to the laser diode 60 to perform switch operation between a first mode and a second mode. In the first mode, both the TE polarization component and the TM polarization component are output from the laser diode 60, and in the second mode, only the TM polarization component is output from the laser diode 60. The photo-reception device 73 receives light which has been emitted from the laser diode 60 and then passed through the thermally-assisted magnetic recording head section 10. Incidentally, a polarizing plate 76 may be provided between the laser diode 60 and the photo-reception device 73. The polarizing plate 76 has a function to allow the TE polarization component to pass therethrough and to remove the TM polarization component.

Specifically, first, an adhesive layer 58 is formed by, for example, evaporation method on a predetermined position of a back surface 11BZ of a bar 11B which is to be a back surface 11B of the slider 11 eventually. The adhesive layer 58 is for bonding the light source unit 50 to the slider 11. The adhesive layer 58 is made of, for example, a solder, namely, a simple substance of Sn (tin), or an alloy including Sn, Pb (lead), or Bi (bismuth). More specifically, an alloy including SnAu, SnCu, SnAl, SnSi, SnGe, SnMg, SnPb, SnAg, SnZn, SnBi, SnNi, SnPt, PbAu, PbMg, PbBi, BiAu or the like may be used. Note that the adhesive layer 58 may be provided on the bonding surface 51A of the supporting member 51 facing the back surface 11BZ.

Figure 14:
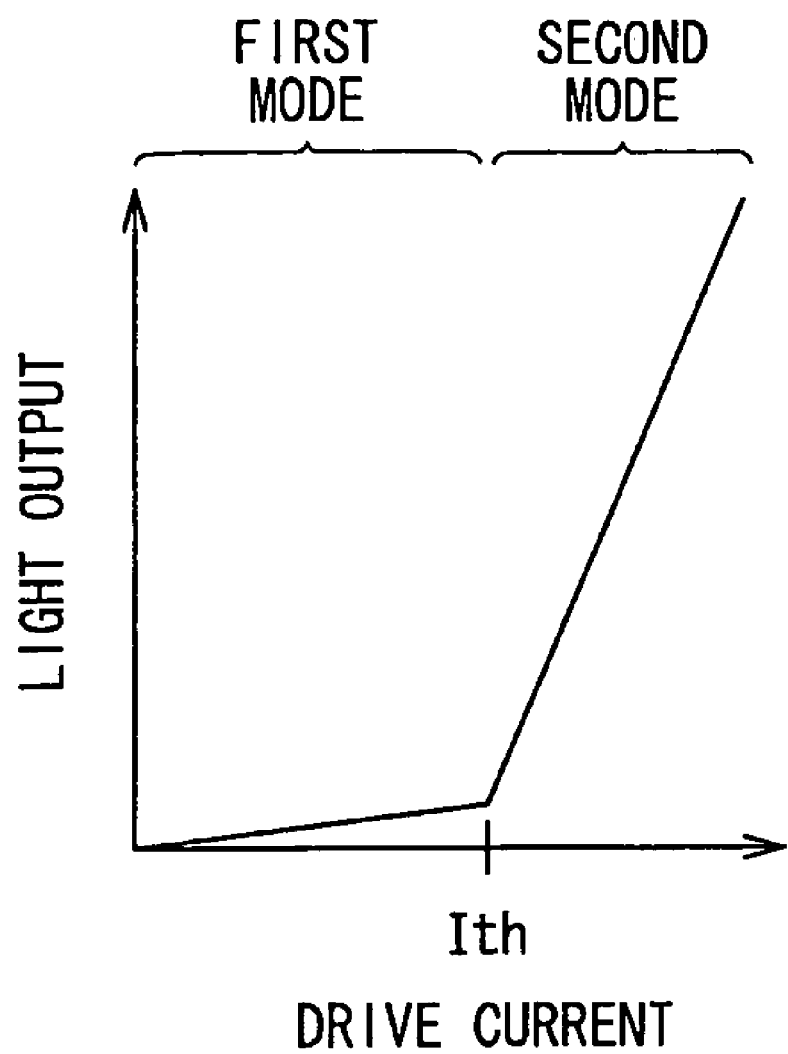
FIG. 14 is a characteristic diagram illustrating a relationship between a drive current and light output of a laser diode.

Next, the bar 11Z is arranged on the tray 72 of the alignment apparatus 70, and then the light source unit 50 is attached to the probe 71 of the alignment apparatus 70. At this time, the bonding surface 51A of the supporting member 51 is opposed to the back surface 11BZ of the bar 11Z. Subsequently, a predetermined voltage is applied between terminal electrodes 610 and 611 of the laser diode 60 to allow a laser beam 77 to be emitted from the emission center 62A of the active layer 62 (FIG. 4). Herein, both the TE polarization component and the TM polarization component are outputted. As described in FIG. 14, for example, the laser diode 60 has a property in which the light output is increased with increasing the drive current. The drive current lower than a predetermined threshold current Ith leads to the first mode (LED emission state) in which both the TE polarization component and the TM polarization component are outputted. The drive current higher than the predetermined threshold current Ith leads to the second mode (LD oscillation state) in which the TE polarization component is more outputted compared with the TM polarization component. Accordingly, in this case, the controller 74 controls the drive current supplied to the laser diode 60 to be lower than the threshold current Ith, and therefore the LED emission state is achieved. Note that, as illustrated in FIG. 14, in the LD oscillation state, rate of change (gradient) in the light output with respect to the drive current is extremely large compared with in the LED emission state.

Next, alignment between the light source unit 50 (the laser diode 60) and the magnetic read write head section 10 is performed based on the intensity distribution of the TE polarization component which has been emitted from the laser diode 60 and then passed through the waveguide 32. Specifically, the light source unit 50 is moved in the X-axis direction (the direction across tracks) and the Z-axis direction while the laser beam 77 is maintained to be emitted and the photo-reception device 73 sequentially detects the TE polarization component emitted from the waveguide 32. With this operation, maximum peak position of the intensity distribution of the TE polarization component detected by the photo-reception device 73 is allowed to be coincident with the reference position of the magnetic read write head section 10. For example, an alignment between the reference position of the tray 72 and the optical axis of the photo-reception device 73 is performed in advance, and the alignment between the light source unit 50 and the magnetic read write head section 10 is performed by moving only the light source unit 50 held by the probe 71. Incidentally, at the stage in which the laser beam 77 has been emitted from the laser diode 60, the intensity of the TE polarization component is substantially equal to that of the TM polarization component, however at the stage in which the laser beam 77 has been passed through the magnetic read write head section 10, the intensity of the TM polarization component is lowered to the intensity of about 20% of the TE polarization component. This is because in the magnetic read write head section 10 of the embodiment, the TM polarization component forms combination with the plasmon generator 34, and is appeared as near-field light NF from the ABS 11S, however most part of the TM polarization component is converted into heat energy at the time of propagating through the plasmon generator 34. Accordingly, the TM polarization component hardly affects the alignment between the light source unit 50 and the magnetic read write head section 10. Incidentally, when the polarizing plate 76 is arranged on the way to the photo-reception device 73, the TM polarization component is sufficiently removed to allow the alignment with higher accuracy.

Figure 15:
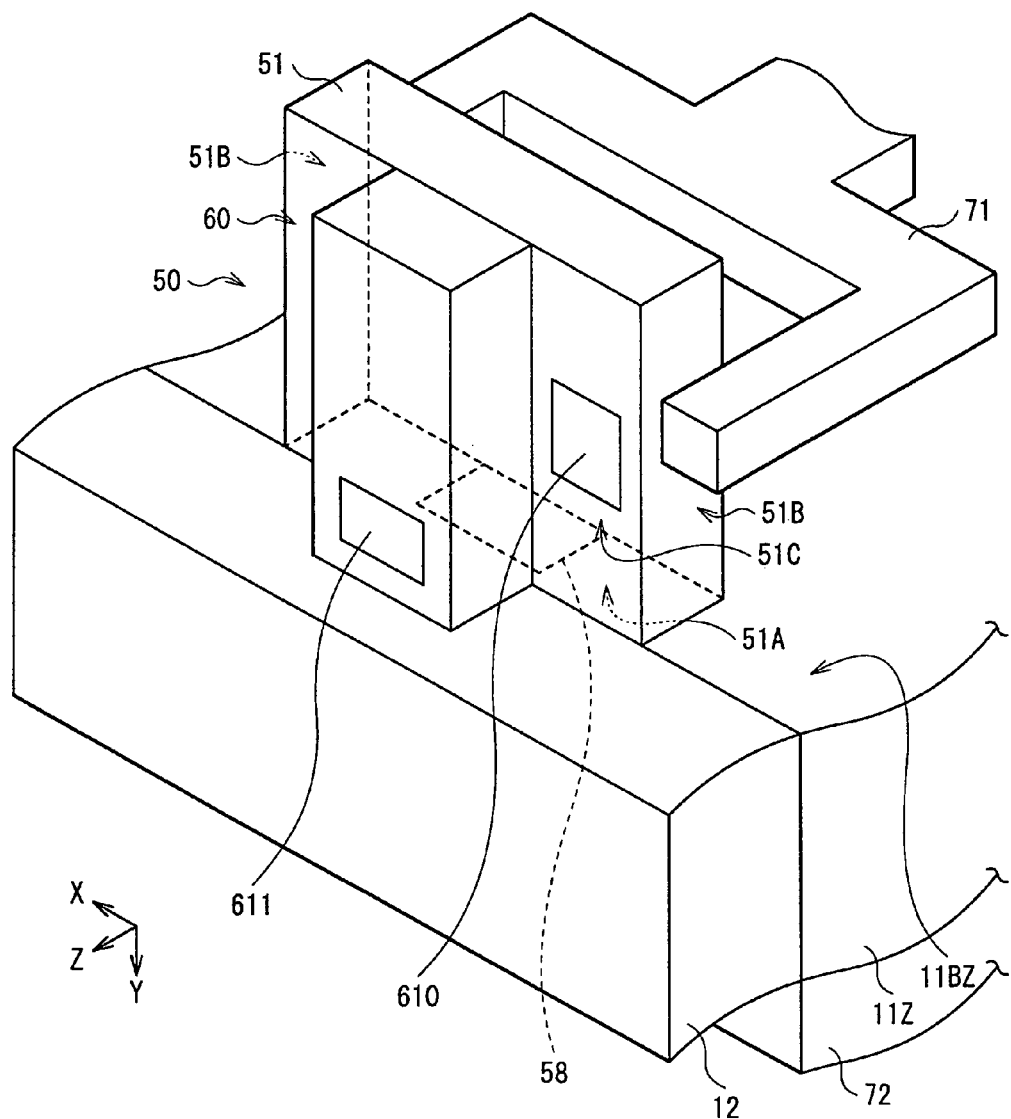
FIG. 15 is a perspective view illustrating a process following the process of FIG. 13.

Thereafter, while the relative position between the light source unit 50 and the magnetic read write head section 10 is maintained, the light source unit 50 is moved in the Y-axis direction to come into contact with the slider 11 through the adhesive layer 58 as illustrated in FIG. 15. Therefore, the alignment between the light source unit 50 and the bar 11Z and the alignment between the light source unit 50 and the element forming layer 12 are completed.

Subsequently, as illustrated in FIGS. 16A and 16B, while the relative position between the light source unit 50 and the thermally-assisted magnetic recording head section 10 is maintained, a laser beam LB with a predetermined wavelength which passes through the supporting member 51 is applied to the both side surfaces 51B of the supporting member 51. As the laser beam LB, for example, an Nd-YAG laser beam ($\lambda$=1064 nm) may be used. Accordingly, the supporting member 51 is heated. Note that the irradiation trace 51H is formed by irradiation of the laser beam LB on and near the irradiated position P on the both side surfaces 51B of the supporting member 51. The irradiation trace 51H has an ellipsoidal planar shape whose major axis is along the traveling direction of the laser beam LB, and is a concave section whose depth is gradually increased along the traveling direction of the laser beam LB. Note that FIG. 16A is a top view of the plurality of light source units 50 arranged on the bar 11Z, viewed from the top side. FIG. 16B is a side view of a given light source unit 50 viewed from the side.

At this time, the laser beam LB is applied to the supporting member 51 from obliquely rearward as illustrated in FIG. 16A. In other words, the laser beam LB is applied in a direction having a vector component along the Z-axis direction from the back surface (the surface opposite to the light source mounting surface 51C) 51E of the supporting member 51 toward the light source mounting surface 51C. When the trajectory of the laser beam LB is projected on a plane (XZ plane) parallel to the back surface 11B and the bonding surface 51A, the incident direction of the laser beam LB forms an angle $\theta 1$ with respect to the arrangement direction (the X-axis direction) of the light source unit 50. Therefore, even if the protect means such as shield plate is not provided, damage of the bar 11Z caused by reflected light RL of the laser beam LB from (the irradiated position P of) the side surface 51B is avoidable. In addition, since the laser beam LB is applied from the direction where the light source mounting surface 51C is in a blind area, the possibility that the laser diode 60 and the terminal electrodes 610 and 611 provided on the light source mounting surface 51C are damaged by the error irradiation (due to positional deviation or the like) of the laser beam LB is allowed to be eliminated.

As illustrated in FIG. 16B, the laser beam LB is applied from the obliquely above, namely, the laser beam LB is applied in a direction having a vector component along the Y-axis direction from the top surface (the surface opposite to the bonding surface 51A) 51D of the supporting member 51 toward the bonding surface 51A. Therefore, compared with the case where the vector component in the Y-axis direction in the laser beam LB is zero, the heat energy propagating from the irradiated position P to the adhesive layer 58 is increased. In this case, the laser beam LB desirably enters the supporting member 51 at an angle $\theta 2$ which allows the reflected light RL from the irradiated position P to be avoided from entering the bar 11Z and the element forming layer 12 in order to prevent the bar 11Z and the element forming layer 12 from being damaged by the reflected light RL. Note that the angle $\theta 2$ is an angle formed by an incident direction of the laser beam LB with respect to the Y-axis direction which is orthogonal to the bonding surface 51A and the back surface 11B.

The adhesive layer 58 receives energy by heat conduction from the supporting member 51 which is heated by irradiation of the laser beam LB, and then the adhesive layer 58 is melted. After that, when the irradiation of the laser beam LB is stopped, the melted adhesive layer 58 is rapidly solidified. As a result, the supporting member 51 of the light source unit 50 and the slider 11 are bonded with accurate positional relationship. Incidentally, the irradiation of the laser beam LB is performed in an extremely short time of, for example, about 1 to 50 ms. Accordingly, the magnetic read write head section 10 embedded in the element forming layer 12 may be prevented from being affected by the heat. Incidentally, when the diameter of the laser beam LB is set to 100 μm, the irradiated position P is desirably set at a position 150 μm or less apart from the back surface 11 of the bar 11Z. In addition, the laser beam LB is desirably applied not to the back surface 11BZ of the bar 11Z but to the side surface 51B of the supporting member 51 with all amount in order to prevent the bar 11Z from being damaged. Note that the angle θ2 may be 0°. In this case, the irradiated position P is lowered in position (close to the back surface 11BZ) so that the adhesive layer 58 is efficiently heated. Moreover, only S-polarized light may be applied as the laser beam LB. In this case, a polarizing plate PP is arranged between the light source (not illustrated) and the supporting member 51 to block P-polarized light, and the S-polarized light is allowed to enter the supporting member 51 at a Brewster's angle (for example 75°) which is determined from the refractive index of a material (for example, Si) corresponding to the wavelength of the laser beam LB. As a result, generation of the reflected light RL on the irradiated plane (side surface 51B) is allowed to be prevented. Moreover, to prevent the generation of the reflected light on the side surface 51B, the side surface 51B may be a rough surface (for example, surface roughness Rz=0.2 to 0.8 μm).

In such a way, the manufacture of the magnetic head device 4A is completed.

[Control Circuit of Magnetic Disk Device]

Next, referring to FIG. 17, the circuit configuration of the control circuit of the magnetic disk device illustrated in FIG. 1 and the operation of the magnetic read write head section 10 will be described below. The control circuit includes a control LSI (large-scale integration) 100, a ROM (read only memory) 101 connected to the control LSI 100, a write gate 111 connected to the control LSI 100, and a write circuit 112 connecting the write gate 111 to the coil 41. The control circuit further includes a constant current circuit 121 connected to the MR element 22 and the control LSI 100, an amplifier 122 connected to the MR element 22, and a demodulation circuit 123 connected to the output end of the amplifier 122 and the control LSI 100. The control circuit further includes a laser control circuit 131 connected to the laser diode 60 and the control LSI 100, and a temperature detector 132 connected to the control LSI 100.

Herein, the control LSI 100 provides write data and a write control signal to the write gate 111. Moreover, the control LSI provides a read control signal to the constant current circuit 121 and the demodulation circuit 123, and receives the read data output from the demodulation circuit 123. In addition, the control LSI 100 provides a laser ON/OFF signal and an operation current control signal to the laser control circuit 131.

The temperature detector 132 detects the temperature of the magnetic recording layer of the magnetic disk 2 to transmit the temperature information to the control LSI 100.

The ROM 101 stores a control table and the like to control an operation current value to be supplied to the laser diode 60.

At the time of write operation, the control LSI 100 supplies the write data to the write gate 111. The write gate 111 supplies the write data to the write circuit 112 only when the write control signal instructs write operation. The write circuit 112 allows the write current to flow through the coil 41 according to the write data. As a result, write magnetic field is generated from the magnetic pole 35, and data is written into the magnetic recording layer of the magnetic disk 2 by the write magnetic field.

At the time of read operation, the constant current circuit 121 supplies a constant sense current to the MR element 22 only when the read control signal instructs the read operation. The output voltage of the MR element 22 is amplified by the amplifier 122, and is then received by the demodulation circuit 123. The demodulation circuit 123 demodulates the output of the amplifier 122 to generate read data to be provided to the control LSI 100 when the read control signal instructs the read operation.

The laser control circuit 131 controls the supply of the operation current to the laser diode 60 based on the laser ON/OFF signal, and controls the value of the operation current supplied to the laser diode 60 based on the operation current control signal. The operation current larger than the oscillation threshold value is supplied to the laser diode 60 by the control of the laser control circuit 131 when the laser ON/OF signal instructs the ON operation. As a result, the laser beam is emitted from the laser diode 60 and then propagates through the waveguide 32. Subsequently, the near-field light NF (described later) is generated from the pointed edge 34G of the plasmon generator 34, a part of the magnetic recording layer of the magnetic disk 2 is heated by the near-field light NF, and thus the coercivity in the heated part is lowered. At the time of writing, the write magnetic field generated from the magnetic pole 35 is applied to the part of the magnetic recording layer with lowered coercivity, and therefore data recording is performed.

The control LSI 100 determines the value of the operation current of the laser diode 60 with reference to the control table stored in the ROM 101, based on the temperature and the like of the magnetic recording layer of the magnetic disk 2 measured by the temperature detector 132, and controls the laser control circuit 131 with use of the operation current control signal so that the operation current of the value is supplied to the laser diode 60. The control table includes, for example, the oscillation threshold value of the laser diode 60 and data indicating temperature dependency of light output-operation current property. The control table may further include data indicating a relationship between the operation current value and the increased amount of the temperature of the magnetic recording layer heated by the near-field light NF, and data indicating temperature dependency of the coercivity of the magnetic recording layer.

Figure 17:
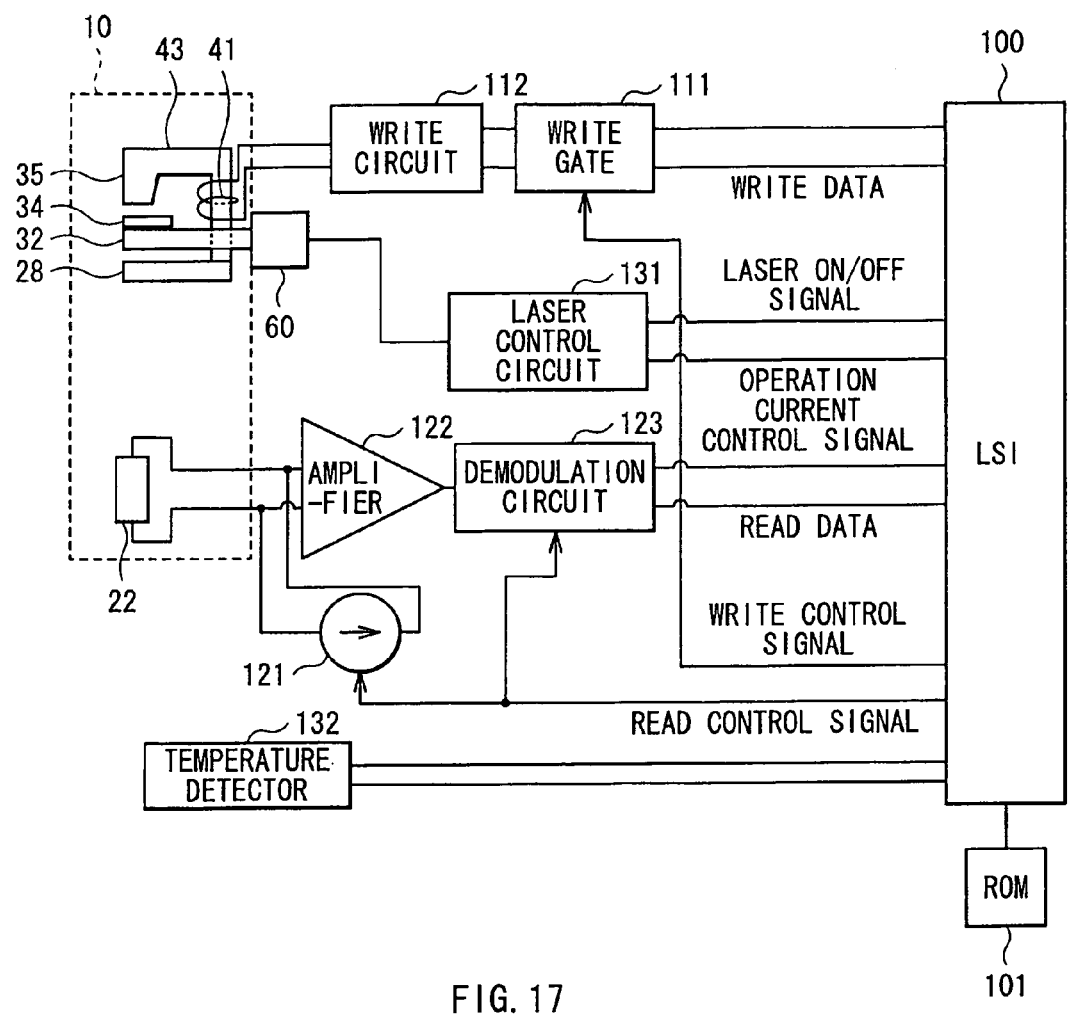
FIG. 17 is a block diagram illustrating a circuit configuration of the magnetic disk device illustrated in FIG. 1.

The control circuit illustrated in FIG. 17 has a signal system for controlling the laser diode 60, that is, a signal system of the laser ON/OFF signal and the operation current control signal, independent of the control signal system of write/read operation. Therefore, various conduction modes to the laser diode 60 are allowed to be achieved, in addition to the conduction to the laser diode 60 simply operated with the write operation. Note that the configuration of the control circuit of the magnetic disk device is not limited to that illustrated in FIG. 17.

Figure 18:
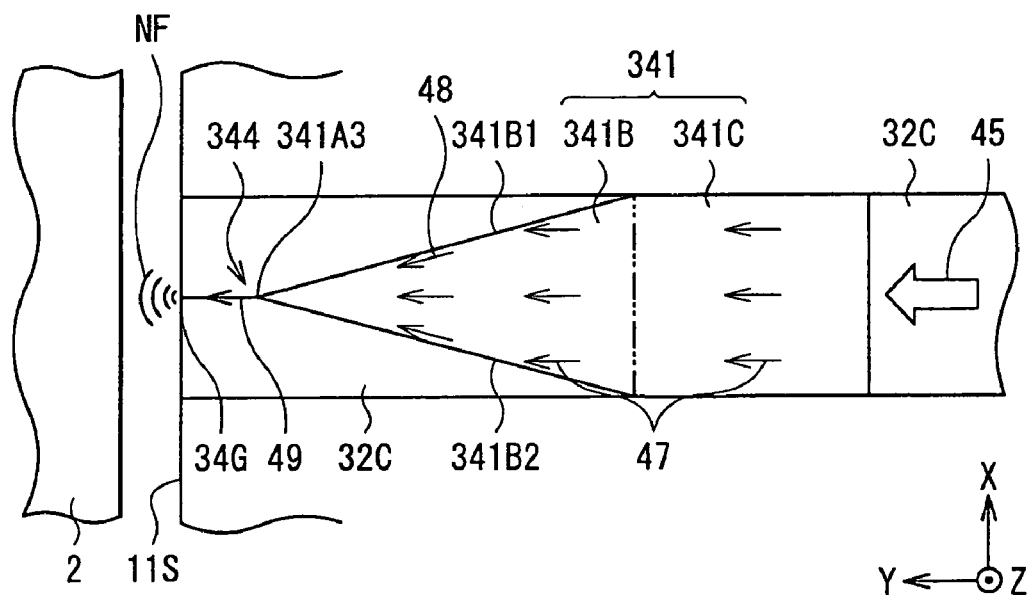
FIG. 18 is an explanatory diagram for describing an operation of the magnetic read write head.

Subsequently, a principle of near-field light generation in the embodiment and a principle of thermally-assisted magnetic recoding with use of the near-field light will be described with reference to FIGS. 9 and 18. Similarly to FIG. 10, FIG. 18 is a plane view illustrating a positional relationship between the surface plasmon exciting surface 341 and the evanescent light generating surface 32C, and illustrates a state where the plasmon generator 34 and the waveguide 32 are viewed from the magnetic pole 35 side.

The laser beam which has been emitted from the laser diode 60 propagates through the waveguide 32 to reach near the plasmon generator 34. At this time, a laser beam 45 is totally reflected by the evanescent light generating surface 32C that is an interface between the waveguide 32 and the buffer section 33A, and therefore evanescent light 46 (FIG. 9) leaking into the buffer section 33A is generated. After that, the evanescent light 46 couples with charge fluctuation on the surface plasmon exciting surface 341 out of the outer surface of the plasmon generator 34 to induce a surface plasmon polariton mode. As a result, surface plasmons 47 (FIG. 18) are excited on the surface plasmon exciting surface 341. The surface plasmons 47 propagate on the surface plasmon exciting surface 341 toward the pointed edge 34G. The first surface 341B of the surface plasmon exciting surface 341 is configured so that the width thereof in the X-axis direction becomes narrower toward the ABS 11S as described above. Accordingly, when propagating on the first surface 341B, the surface plasmons 47 are gradually converted into edge plasmons 48 (FIG. 18) as surface plasmons propagating along the edge rims 341B1 and 341B2, and the electric field intensity of the plasmons including the surface plasmons 47 and the edge plasmons 48 is increased. The surface plasmons 47 and the edge plasmons 48 are converted into edge plasmons 49 (FIG. 18) when reaching the edge 344, and the edge plasmons 49 propagate along the edge 344 toward the ABS 11S. The edge plasmons 49 eventually reach the pointed edge 34G. As a result, the edge plasmons 49 are collected at the pointed edge 34G to generate the near-field light NF from the pointed edge 34G, based on the edge plasmons 49. The near-field light NF is irradiated toward the magnetic disk 2 and reaches the surface (recording surface) of the magnetic disk 2 to heat a part of the magnetic recording layer of the magnetic disk 2. As a result, the coercivity at the heated part of the magnetic recording layer is lowered. In the thermally-assisted magnetic recording, with respect to the part of the magnetic recording layer with the coercivity thus lowered, data recording is performed by application of the write magnetic filed generated by the magnetic pole 35.

It is considered that the following first and second principals lead to the increase of the electric field intensity of the plasmons on the first surface 341B. First, the description is made for the first principle. In the embodiment, on the metal surface of the surface plasmon exciting surface 341, the surface plasmons 47 are excited by the evanescent light 46 generated from the evanescent light generating surface 32C. The surface plasmons 47 propagate on the surface plasmon exciting surface 341 toward the pointed edge 34G. The wave number of the surface plasmons 47 propagating on the first surface 341B is gradually increased with decreasing the width of the first surface 341B in the X-axis direction, that is, toward the ABS 11S. As the wave number of the surface plasmons 47 is increased, the propagating speed of the surface plasmons 47 is decreased. As a result, the energy density of the surface plasmons 47 is increased to increase the electric field intensity of the surface plasmons 47.

Next, the description is made for the second principle. When the surface plasmons 47 propagate on the surface plasmon exciting surface 341 toward the pointed edge 34G, a part of the surface plasmons 47 collide with the edge rims 341B1 and 341B2 of the first surface 341B and is scattered, and accordingly a plurality of plasmons with different wave numbers is generated. A part of the plurality of the plasmons thus generated is converted into the edge plasmons 48 whose wave number is larger than that of the surface plasmons propagating on the plane. In such a way, the surface plasmons 47 are gradually converted into the edge plasmons 48 propagating along the edge rims 341B1 and 341B2, and accordingly, the electric field intensity of the edge plasmons 48 is gradually increased. In addition, the edge plasmons 48 have a larger wave number and slower propagating speed compared with the surface plasmons propagating on the plane. Therefore, the surface plasmons 47 are converted into the edge plasmons 48 to increase the energy density of the plasmons. Further, on the first surface 341B, the surface plasmons 47 are converted into the edge plasmons 48 as described above, and new surface plasmons 47 are also generated based on the evanescent light 46 emitted from the evanescent light generating surface 32C. The new surface plasmons 47 are also converted into the edge plasmons 48. In this way, the electric field intensity of the edge plasmons 48 is increased. The edge plasmons 48 are converted into the edge plasmons 49 propagating through the edge 344. Therefore, the edge plasmons 49 are obtainable which have the increased electric field intensity compared with the surface plasmons 47 at the beginning of generation.

In the embodiment, on the first surface 341B, the surface plasmons 47 propagating on the plane coexist with the edge plasmons 48 whose wave number is larger than that of the surface plasmons 47. It is considered that, on the first surface 341B, the increase of the electric field intensity of both the surface plasmons 47 and the edge plasmons 48 occurs due to the first and second principals described above. Accordingly, in the embodiment, compared with a case where one of the first and second principals is effective, the electric field intensity of the plasmons may be further increased.

Figure 19:
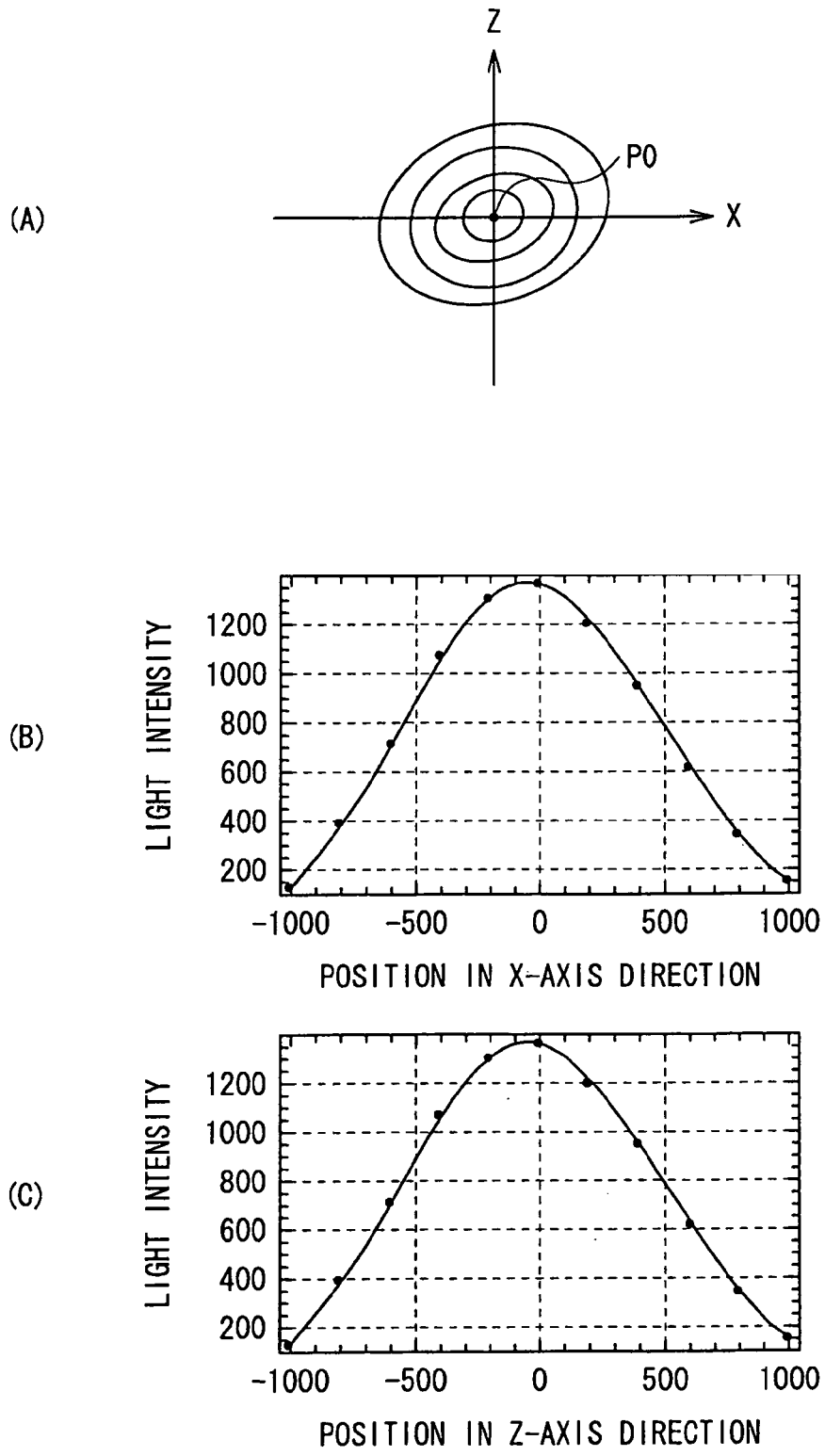
FIG. 19 is schematic diagrams illustrating a intensity distribution of a TE polarization component which has passed through a waveguide of a magnetic read write head section according to an embodiment.
Figure 20:
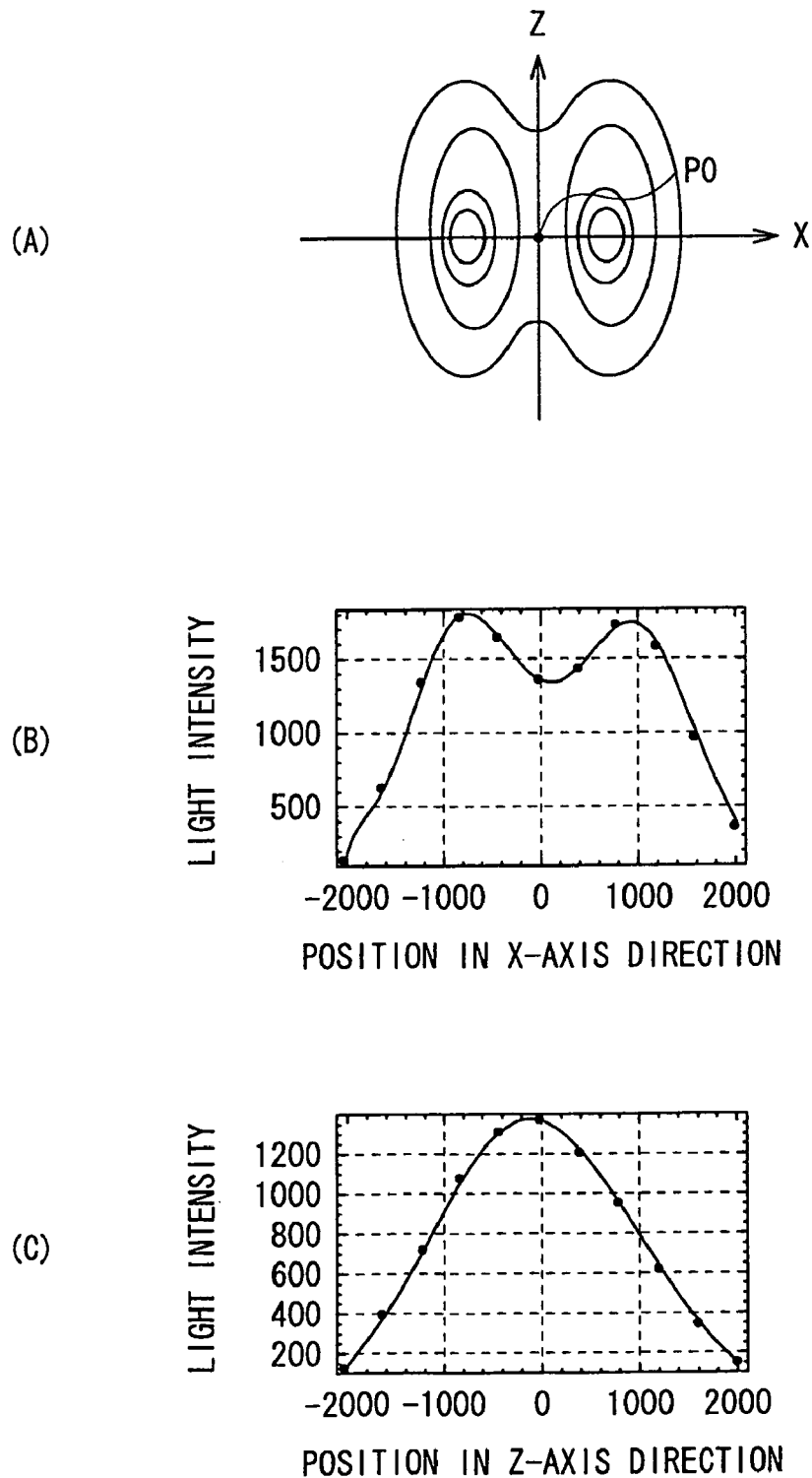
FIG. 20 is schematic diagrams illustrating an intensity distribution of near-field light from the magnetic read write head section according to the embodiment.

In the embodiment, as described above, when the alignment between the laser diode 60 and the magnetic read write head section 10 in manufacturing is performed, the drive current is controlled to allow the laser diode 60 to be in the LED emission state, and the TE polarization component which has passed through the waveguide 32 is observed. As a result, compared with the case where the above-described alignment is performed while TM polarization component is observed, the positional accuracy of both components is improved with relative ease. This is because, as illustrated in FIG. 19, the TE polarization component which has passed through the waveguide 32 exhibits monomodality, that is, intensity distribution with a single peak, and the optimal position PO as the reference of the alignment is allowed to be determined with relative ease. Note that FIG. 19A is a schematic view illustrating intensity distribution of the TE polarization component which has passed through the waveguide 32, on the XZ-plane parallel to the ABS 11S. FIG. 19B illustrates a relationship between the position in the X-axis direction and the intensity of the TE polarization component, and FIG. 19C illustrates a relationship between the position in the Z-axis direction and the intensity of the TE polarization component. On the other hand, the near-field light generated as a result of plasmon coupling between the TM polarization component and the plasmon generator 34 has two maximum peaks, that is, exhibits bimodal intensity distribution as illustrated in FIG. 20. Therefore, it is difficult to uniquely determine the optimal position PO as the reference of the alignment. Note that FIG. 20A is a schematic view illustrating the intensity distribution of the near-field light from the magnetic read write head section 10 on the XZ-plane parallel to the ABS 11S. FIG. 20B illustrates a relationship between the position in the X-axis direction and the intensity of the near-field light, and FIG. 20C illustrates a relationship between the position in the Z-axis direction and the intensity of the near-field light. In the embodiment, a position at which the maximum peak of the TE polarization component is obtained is coincident with a position at which maximum coupling efficiency of the TM polarization component and the plasmon generator 34 in the LD oscillation state. Therefore, energy of the laser beam oscillated from the laser diode 60 is more efficiently used to perform the thermally-assisted magnetic recording. In other words, the magnetic read write head section 10 may achieve power saving. Moreover, as a result of accurate alignment, write positional accuracy with respect to a predetermined region of the magnetic recording medium is allowed to be improved, and thus magnetic recording with high density is achievable.

Moreover, in the embodiment, as described above, the light source unit 50 and the slider 11 (the bar 11Z) are bonded by application of the laser beam LB to the side surface 51B of the supporting member 51. The laser beam LB is applied to the supporting member 51 from rearward where the light source mounting surface 51C provided with the laser diode 60 is in a blind area. In the case where the laser beam LB is applied from the front side of the light source unit, there is a possibility that the laser diode 60 provided on the light source mounting surface 51C and the terminal electrodes 610 and 611 of the laser diode 60 are damaged by error application of the laser beam LB. However, in the embodiment, the damage caused by such error application is avoidable. Accordingly, in the embodiment, the thermally-assisted magnetic head device which has extremely high positional accuracy between the light source unit 50 and the magnetic read write head section 10 and is suitable for high density recording is allowed to be realized.

Although the present invention has been described with the embodiment, the present invention is not limited to the embodiment described above, and various modifications may be made. For example, in the embodiment, although exemplified is a CPP-type GMR element as a read element, the read element is not limited thereto and may be a CIP (current in plane)—GMR element. In this case, an insulating layer needs to be provided between an MR element and a lower shield layer, and between the MR element and an upper shield layer, and a pair of leads for supplying a sense current to the MR element needs to be inserted into the insulating layer. Alternatively, a TMR (tunneling magnetoresistance) element with a tunnel junction film may be used as a read element.

In addition, in the thermally-assisted magnetic recording head according to the invention, the configurations (shapes, positional relationship, and the like) of the waveguide, the plasmon generator, the magnetic pole, and the like are not limited to those described in the above-described embodiment, and the thermally-assisted magnetic recording head having other configuration may be available.

The correspondence relationship between the reference numerals and the components of the embodiment is collectively illustrated here.

1 ... housing, 2 ... magnetic disk, 3 ... head arm assembly (HAA), 4 ... head gimbals assembly (HGA), 4A ... magnetic head device, 4B ... suspension, 5 ... arm, 6 ... driver, 7 ... fixed shaft, 8 ... bearing, 9 ... spindle motor, 10 ... magnetic read write head section, 11 ... slider, 11A ... element forming surface, 11B ... back surface, 11S ... air bearing surface (ABS), 12 ... element forming layer, 13 ... insulating layer, 14 ... read head section, 16 ... write head section, 17 ... clad, 21 ... lower shield layer, 22 ... MR element, 23 ... upper shield layer, 24, 25, 27, 38, 39, 42 ... insulating layer, 28 ... lower yoke layer, 29 ... leading shield, 30, 36, 37 ... connecting layer, 31L, 31U, 33A, 33B ... clad, 32, 72 ... waveguide, 34 ... plasmon generator, C34 ... mid-portion, W34 ... wing portion, 34A to 34C ... first to third portions, 34G ... pointed edge, 34L ... lower layer, 34U ... upper layer, 341 ... surface plasmon exciting surface, 344 ... edge, 35, 75 ... magnetic pole, 351 ... first layer, 352 ... second layer, 40A, 40B ... connecting section, 41 ... coil, 43 ... upper yoke layer, 45 ... laser light, 46 ... evanescent light, 47 ... surface plasmon, 48, 49 ... edge plasmon, 50 ... light source unit, 51 ... supporting member, 51A ... bonding surface, 51B ... side surface, 51C ... light source mounting surface, 58 ... adhesive layer, 60 ... laser diode, 61 ... lower electrode, 62 ... active layer, 63 ... upper electrode, 64 ... reflective layer, 65 ... n-type semiconductor layer, 66 ... p-type semiconductor layer, 70 ... alignment apparatus, 71 ... probe, 72 ... tray, 73 ... photo-reception device, 74 ... controller, 75 ... driver, 76 ... polarizing plate, 77 ... laser beam, NF ... near-field light.

What is claimed is:

1. A method of manufacturing a thermally-assisted magnetic recording head, comprising:
    providing a light source unit including a laser diode:
    providing a slider having a thermally-assisted magnetic recording head section thereon, the thermally-assisted magnetic recording head section including a magnetic pole, an optical waveguide, and a plasmon generator, the magnetic pole and the optical waveguide both extending toward an air bearing surface, the plasmon generator being located between the magnetic pole and the optical waveguide;
    driving the laser diode to allow a light beam to be emitted therefrom, the light beam including both a transverse electric (TE) polarization component and a transverse magnetic (TM) polarization component;
    performing an alignment between the light source unit and the thermally-assisted magnetic recording head section, based on a light intensity distribution of the TE polarization component in the light beam which has been emitted from the laser diode and then passed through the optical waveguide; and
    bonding the light source unit to the slider after the alignment is completed.

2. The method of manufacturing a thermally-assisted magnetic recording head according to claim 1, wherein the light beam which has passed through the optical waveguide includes the TE polarization component as a main component.

3. The method of manufacturing a thermally-assisted magnetic recording head according to claim 1, wherein
    the laser diode is operated in a first driving mode in which a drive current equal to or smaller than a threshold value is used or in a second driving mode in which a drive current larger than the threshold value is used, and the laser diode emits, in the first driving mode, the light beam including both the TE polarization component and the TM polarization component.

4. The method of manufacturing a thermally-assisted magnetic recording head according to claim 1, further comprising:
    removing, with use of a polarizing plate, the TM polarization component in the light beam which has been emitted from the laser diode.

5. The method of manufacturing a thermally-assisted magnetic recording head according to claim 1, wherein the TE polarization component is a monomodal component exhibiting a light intensity distribution with a single peak, and the TM polarization component is a bimodal component exhibiting a light intensity distribution with two peaks.

6. The method of manufacturing a thermally-assisted magnetic recording head according to claim 1, wherein the plasmon generator is arranged to allow one end surface thereof to be exposed at the air bearing surface, or is arranged to allow the one end surface to be located at a position recessed from the air bearing surface with a transparent substance in between.

7. The method of manufacturing a thermally-assisted magnetic recording head according to claim 6, wherein the waveguide is arranged to allow one end surface thereof to be exposed at the air bearing surface, or is arranged to allow the one end surface to be located at a position recessed from the air bearing surface with another transparent substance in between.

8. The method of manufacturing a thermally-assisted magnetic recording head according to claim 7, wherein the plasmon generator and the optical waveguide are arranged to allow a first projection and a second projection to be prevented from overlapping with each other, the first projection being obtained through projecting the one end surface of the plasmon generator onto the air bearing surface, the second projection being obtained through projecting the one end surface of the optical waveguide onto the air bearing surface.

9. A method of manufacturing a thermally-assisted magnetic recording head, comprising:
   providing a light source unit including a laser diode;
   providing a slider having a thermally-assisted magnetic recording head section thereon, the thermally-assisted magnetic recording head section including a magnetic pole, an optical waveguide, and a plasmon generator, the magnetic pole and the optical waveguide both extending toward an air bearing surface, the plasmon generator being located between the magnetic pole and the optical waveguide;
   driving the laser diode to allow a light beam to be emitted therefrom, the light beam including both a monomodal component exhibiting a light intensity distribution with a single peak and a bimodal component exhibiting a light intensity distribution with two peaks;
   performing an alignment between the light source unit and the thermally-assisted magnetic recording head section, based on the light intensity distribution of the monomodal component in the light beam which has been emitted from the laser diode and then passed through the optical waveguide; and
   bonding the light source unit to the slider after the alignment is completed.

10. An alignment apparatus allowing a light source unit including a laser diode to be aligned with a slider having a thermally-assisted magnetic recording head section thereon, the thermally-assisted magnetic recording head section including a magnetic pole, an optical waveguide, and a plasmon generator, the magnetic pole and the optical waveguide both extending toward an air bearing surface, the plasmon generator being located between the magnetic pole and the optical waveguide, the alignment apparatus comprising:
   a diver driving the laser diode to allow a light beam to be emitted therefrom, the light beam including both a transverse electric (TE) polarization component and a transverse magnetic (TM) polarization component;
   a photo-reception device receiving a light beam which has been emitted from the laser diode and then passed through the optical waveguide; and
   a controller controlling a relative-positional relationship between the light source unit and the slider, based on a light intensity distribution of the TE polarization component in the light beam which comes into the photo-reception device.

11. The alignment apparatus according to claim 10, wherein the light beam which has passed through the optical waveguide includes the TE polarization component as a main component.

12. The alignment apparatus according to claim 10, wherein
   the laser diode is operated in a first driving mode in which a drive current equal to or smaller than a threshold value is used or in a second driving mode in which a drive current larger than the threshold value is used, and the laser diode emits, in the first driving mode, the light beam including both the TE polarization component and the TM polarization component.

13. The alignment apparatus according to claim 10, further comprising a polarizing plate removing the TM polarization component in the light beam which has been emitted from the laser diode.

14. The alignment apparatus according to claim 10, wherein the TE polarization component is a monomodal component exhibiting a light intensity distribution with a single peak, and the TM polarization component is a bimodal component exhibiting a light intensity distribution with two peaks.

15. An alignment apparatus allowing a light source unit including a laser diode to be aligned with a slider having a thermally-assisted magnetic recording head section thereon, the thermally-assisted magnetic recording head section including a magnetic pole, an optical waveguide, and a plasmon generator, the magnetic pole and the optical waveguide both extending toward an air bearing surface, the plasmon generator being located between the magnetic pole and the optical waveguide, the alignment apparatus comprising:
   a diver driving the laser diode to allow a light beam to be emitted therefrom, the light beam including both a monomodal component exhibiting a light intensity distribution with a single peak and a bimodal component exhibiting a light intensity distribution with two peaks;
   a photo-reception device receiving a light beam which has been emitted from the laser diode and then passed through the optical waveguide; and
   a controller controlling a relative-positional relationship between the light source unit and the slider, based on a light intensity distribution of the monomodal component in the light beam which comes into the photo-reception device.

* * * * *